US006285972B1

(12) United States Patent
Barber

(10) Patent No.: US 6,285,972 B1
(45) Date of Patent: Sep. 4, 2001

(54) GENERATING A NONLINEAR MODEL AND GENERATING DRIVE SIGNALS FOR SIMULATION TESTING USING THE SAME

(75) Inventor: Andrew J. Barber, Minneapolis, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/420,023

(22) Filed: Oct. 18, 1999

Related U.S. Application Data
(60) Provisional application No. 60/105,155, filed on Oct. 21, 1998, and provisional application No. 60/112,266, filed on Dec. 15, 1998.

(51) Int. Cl.$^7$ .................................................. G06G 7/48
(52) U.S. Cl. ................................. 703/8; 703/2; 318/561; 318/568.22; 366/78.14; 700/31; 700/32; 701/97
(58) Field of Search .................................. 703/1, 2, 6, 7, 703/8, 21; 318/568.22, 561; 212/275; 360/78.14; 701/97; 700/28–33

(56) References Cited

U.S. PATENT DOCUMENTS

| 3,855,841 | 12/1974 | Hunter ................................. 73/11 |
|---|---|---|
| 4,061,017 | 12/1977 | Sloane et al. ..................... 73/579 |
| 4,480,480 | 11/1984 | Scott et al. ........................ 73/769 |
| 4,513,622 | 4/1985 | Uretsky ............................. 73/664 |
| 4,537,076 | 8/1985 | Lax et al. .......................... 73/662 |
| 4,885,692 | * 12/1989 | Kurihara et al. ................. 701/97 |
| 4,916,632 | 4/1990 | Doi et al. ......................... 364/508 |
| 4,989,158 | 1/1991 | Sloane ............................. 364/508 |
| 5,175,678 | 12/1992 | Frerichs et al. ................. 364/148 |
| 5,209,661 | 5/1993 | Hildreth et al. ................. 434/45 |
| 5,311,421 | * 5/1994 | Nomura et al. ................. 700/37 |
| 5,339,016 | 8/1994 | Thoen ............................. 318/610 |
| 5,353,207 | 10/1994 | Keeler et al. ................... 364/164 |
| 5,377,307 | 12/1994 | Hoskins et al. ................. 395/22 |
| 5,568,404 | 10/1996 | Strumolo ......................... 364/558 |

(List continued on next page.)

FOREIGN PATENT DOCUMENTS

WO 85/03547  8/1985  (WO).
WO 97/42553  11/1997  (WO).

OTHER PUBLICATIONS

B.W. Cryer et al., "A Road Simulation System for Heavy Duty Vehicles", Society of Automotive Engineers, Automotive Engineering Congress and Exposition, Detroit, Michigan, Feb. 23–17, 1976, pp. 1–13.

MTS Brochure, "Explaining the Six Steps of Remote Parameter Control™", MTS Systems Corporation, May 1996, pp. 1–11.

J.B. Craig, "ITFC—How it works and where to use it", Carl Schenck AG, Sep. 1979, pp. 1–61.

Wolpert et al., "Multiple paired forward and inverse models for motor control", Neutral Networks, vol. 11, No. 7/08 , Oct. 1, 1998, pp. 1317–1329.

Jürgen Petersen et al., SAE Technical Paper Series—The Conception, Description, and Applications of a New Vehicle Endurance Test System at AUDI NS, International Congressand Exposition, Detroit, Michigan Feb. 22–26, 1982, pp. 1–13.

(List continued on next page.)

Primary Examiner—Kevin J. Teska
Assistant Examiner—Samuel Broda
(74) Attorney, Agent, or Firm—Westman, Champlin & Kelly, P.A.; S. Koehler

(57) ABSTRACT

A method and system for generating an improved nonlinear system model includes generating a linear system model and using a response therefrom to generate the nonlinear system model. A method and system for generating drive signals for a test system uses the improved nonlinear system model or a conventional nonlinear system model.

35 Claims, 21 Drawing Sheets

U.S. PATENT DOCUMENTS

| | | | |
|---|---|---|---|
| 5,572,440 | 11/1996 | Harashima | 364/508 |
| 5,598,076 * | 1/1997 | Neubauer et al. | 318/568.22 |
| 5,598,329 | 1/1997 | Niemann | 364/150 |
| 5,649,063 | 7/1997 | Bose | 395/22 |
| 5,677,609 * | 10/1997 | Khan et al. | 318/561 |
| 5,729,463 | 3/1998 | Koenig et al. | 364/468.04 |
| 5,901,072 | 5/1999 | Shimmell | 364/578 |
| 5,908,122 * | 6/1999 | Robinett et al. | 212/275 |
| 5,914,830 * | 6/1999 | Kadlec et al. | 360/78.14 |
| 5,949,989 | 9/1999 | Falkowski et al. | 395/500.29 |

OTHER PUBLICATIONS

Ian Cook, "Appendix A—User Presentations: How to Get a Drive File—Jaguar Cars", RPC User Group, 8th RPC User Group Meeting, Nov. 9–10, 1988, Eindhoven, the Netherlands, pp. 1–51.

Schenck Brochure: "ITFC Computer Control—the modern approach to Automated–Muliple–Input Simulation Testing" Carl Schenck AG, prior to Jan. 22, 1998.

Phil Grote and Glen Grenier, "Taking the Test Track to the Lab" Automotive Engineers, Jun. 1987, vol. 95, No. 6, pp. 61–64.

Richard A. Lund, "Multiple Channel Environmental Simulation Techniques" MTS Systems Corporation, Oct. 1–2, 1979, pp. 1–20.

K.J. Hunt and D. Sbarbaro, "Studies in Artificial Neural Network Based Control", University of Glasgow, Scotland, first edition, vol. 49, pp. 109–139.

Jonas Sjoberg and Lester S.H. Ngia, "Neural Nets and Related Model Structures for Nonlinear System Identification", Chalmers University of Technology, Gothenburg, Sweden, pp. 1–28.

"RPC–II Software, Section RPC—Introduction to RPC–II" MTS Systems Corporation, 1987.

"RPC–II Software, Section FRF—Frequency Response Function" MTS Systems Corporation, 1988.

"RPC–II Software, Section THI—Time History Iteration" MTS Systems Corporation, 1988.

"RPC–II Software, Spectral Density Iteration", for MTS Systems Corporation, 1987.

"RPC–II, Section FDB—Frequency Domain Baseline", MTS Systems Corporation, 1987.

RPC–III, Stimulation Testing, Analysis, and Control System. for MTS Systems Corporation, 1997.

Adaptive Inverse Control (AIC) and Online Iteration (OLI), MTS Systems Corporation, 1997.

Jeffery N. Fletcher, "Global Simulation: A New Technique for Multiaxis Test Control", 1990 Proceedings—Institute of Environmental Sciences, pp. 147–156.

Iain G. McGregor, "Use of the Iterative De–Convolution Method for Vehicle Stimulations", Automotive technology and automation: 20th International Symposium, May 1989, Florence, Italy, pp. 889–905.

Richard A. Lund, "Advances In Multiple–Channel Environmental Simulation Techniques", Seminar on Modernization in Automotive Technology, Automotive Research Association in India, Pune, India, Dec. 16–17, 1983.

* cited by examiner

GENERATING A NONLINEAR MODEL AND GENERATING DRIVE SIGNALS FOR SIMULATION TESTING USING THE SAME

CROSS-REFERENCE TO RELATED APPLICATION

This application is based on and claims priority of provisional patent applications 60/105,155 filed Oct. 21, 1998, and 60/112,266 filed Dec. 15, 1998, the contents of which are hereby incorporated by reference in their entirety.

BACKGROUND OF THE INVENTION

The present invention relates to computer modeling of a system, machine or process. More particularly, the present invention relates to generating an improved nonlinear system model, such as a neural network, as well as using a nonlinear system model or the improved nonlinear system model to generate drive signals as input to a vibration system.

Vibration systems that are capable of simulating loads and/or motions applied to test specimens are generally known. Vibration systems are widely used for performance evaluation, durability tests, and various other purposes as they are highly effective in the development of products. For instance, it is quite common in the development of automobiles, motorcycles, or the like, to subject the vehicle or a substructure thereof to a laboratory environment that simulates operating conditions such as a road or test track. Physical simulation in the laboratory involves a well-known method of data acquisition and analysis in order to develop drive signals that can be applied to the vibration system to reproduce the operating environment. This method includes instrumenting the vehicle with transducers "remote" to the physical inputs of the operating environment. Common remote transducers include, but are not limited to, strain gauges, accelerometers, and displacement sensors, which implicitly define the operating environment of interest. The vehicle is then driven in the same operating environment, while remote transducer responses (internal loads and/or motions) are recorded. During simulation with the vehicle mounted to the vibration system, actuators of the vibration system are driven so as to reproduce the recorded remote transducer responses on the vehicle in the laboratory.

However, before simulated testing can occur, the relationship between the input drive signals to the vibration system and the responses of the remote transducers must be characterized or modeled in the laboratory. This procedure is referred to as "system identification" and involves obtaining a respective linear model or transfer function of the complete physical system (e.g. vibration system, test specimen, and remote transducers) hereinafter referred to as the "physical system" and calculating an inverse system linear model or transfer function of the same. The inverse linear system model or transfer function is then used iteratively to obtain suitable drive signals for the vibration system to obtain substantially the same response from the remote transducers on the test specimen in the laboratory situation as was found in the operating environment.

As those skilled in the art would appreciate, this process of obtaining suitable drive signals is not altered when the remote transducers are not physically remote from the test system inputs (e.g. the case where "remote" transducers are the feedback variables, such as force or motion, of the vibration system controller).

Although the above-described method for modeling and obtaining drive signals for a vibration system has enjoyed substantial success, there is a continuing need to improve such systems. In particular, there is a need to improve the system model and/or the process for obtaining the drive signals. Current techniques for obtaining the drive signals subject the test specimen to loads and displacements during the iterative process to ascertain the drive signals. These initial loads and displacements can damage the test specimen before the intended testing occurs. Accordingly, a method and system that reduces application of "non-testing" loads and displacements in developing drive signals would be desirable.

SUMMARY OF THE INVENTION

A method and system for generating an improved nonlinear system model includes generating a linear system model and using a response therefrom to generate the nonlinear system model. In one embodiment, the method includes applying an original system input to the system and obtaining a first system output from the system; generating a linear system model; applying an alternative input to the linear system model and obtaining a linear system output from the linear system model; applying the alternative input to the system and obtaining a second system output, and generating a nonlinear system model using the alternative input, the linear system output from the linear system model and the second output from the system.

A method and system for generating drive signals for a test system uses the improved nonlinear system model or a conventional nonlinear system model. In a first exemplary embodiment, the method includes applying a drive signal to the system; obtaining a response of the system to the drive signal; generating an inverse nonlinear system model using the drive signal and the response; and calculating a final drive signal using a selected response and the inverse nonlinear system model.

In a second embodiment for generating drive signals, the method includes applying a drive signal to the system; obtaining a response of the system to the drive signal; generating a nonlinear system model using the drive signal and the response; generating an inverse linear system model; calculating a test drive signal using a selected response and the inverse linear system model; applying the test drive signal to the nonlinear system model; obtaining an actual response of the nonlinear system model to the test drive signal; calculating an error as a function of the actual response and the selected response; and if the error exceeds a selected threshold, obtaining a new drive signal using the linear system model and repeating the above-described steps where the test drive signal comprises the new drive signal until the error is less than or equal to the selected threshold.

DETAILED DESCRIPTION OF THE ILLUSTRATIVE EMBODIMENTS

Figure 1:
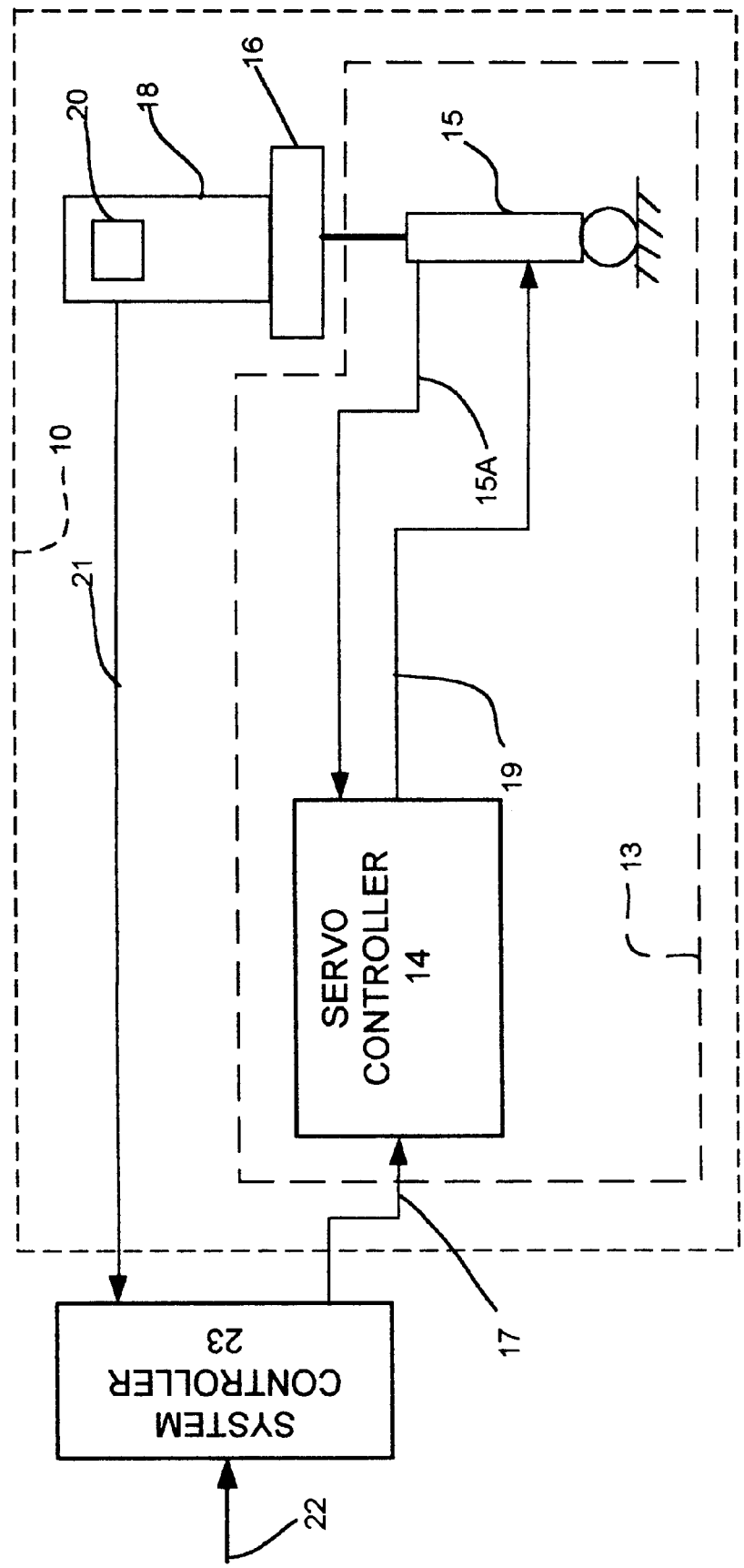
FIG. 1 is a block diagram of an exemplary environment for practicing the present invention.

FIG. 1 illustrates a physical system 10. The physical system 10 generally includes a vibration system 13 comprising a servo controller 14 and an actuator 15. In the schematic illustration of FIG. 1, the actuator 15 represents one or more actuators that are coupled through a suitable mechanical interface 16 to a test specimen 18. The servo controller 14 provides an actuator command signal 19 to the actuator 15, which in turn, excites the test specimen 18. Suitable feedback 15A is provided from the actuator 15 to the servo controller 14. One or more remote transducers 20 on the test specimen 18, such as displacement sensors, strain gauges, accelerometers, or the like, provide a measured or actual response 21. A physical system controller 23 receives the actual response 21 as feedback to compute a drive 17 as input to the physical system 10. In an iterative process discussed below, the physical system controller 23 generates the drive 17 for the physical system 10 based on the comparison of a desired response provided at 22 and the actual response 21 of the remote transducer 20 on the test specimen 18. Although illustrated in FIG. 1 for the single channel case, multiple channel embodiments with response 21 comprising N response components and the drive 17 comprising M drive components are typical and considered another embodiment of the present invention.

Although described herein where the physical system comprises the vibration system 13 and remote transducer 20, aspects of the present invention described below can be applied to other physical systems. For instance, in a manufacturing process, the physical system includes the manufacturing machines (e.g. presses, molding apparatus, forming machines, etc.) and the drive 17 provides command signals to said machines, and the actual response 21 comprises manual or automatic measured parameters of the manufactured article such as a critical dimension. Another example includes an oil refinery where the physical system is the process plant and the actual response 21 comprises intermediate or final parameters related to output products.

Figure 2:
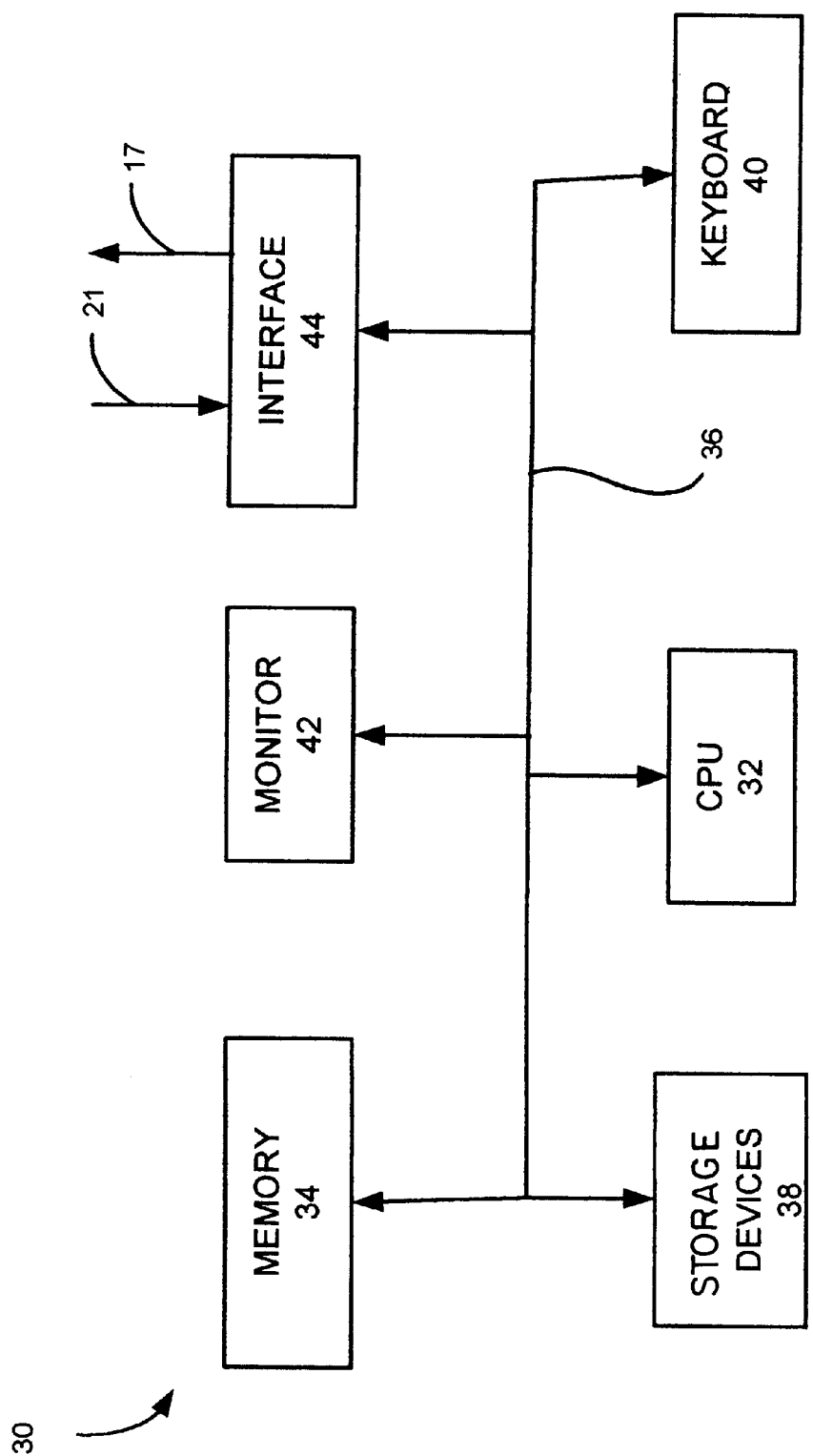
FIG. 2 is a computer for implementing the present invention.

FIG. 2 and the related discussion provide a brief, general description of a suitable computing environment in which the invention may be implemented. Although not required, the physical system controller 23 will be described, at least in part, in the general context of computer-executable instructions, such as program modules, being executed by a computer 30. Generally, program modules include routine programs, objects, components, data structures, etc., which perform particular tasks or implement particular abstract data types. The program modules are illustrated below using block diagrams and flowcharts. Those skilled in the art can implement the block diagrams and flowcharts to computer-executable instructions. Moreover, those skilled in the art will appreciate that the invention may be practiced with other computer system configurations, including multi-processor Systems, networked personal computers, mini computers, main frame computers, and the like. The invention may also be practiced in distributed computing environments where tasks are performed by remote processing devices that are linked through a communications network. In a distributed computer environment, program modules may be located in both local and remote memory storage devices.

The computer 30 illustrated in FIG. 2 comprises a conventional personal or desktop computer having a central processing unit (CPU) 32, memory 34 and a system bus 36, which couples various system components, including the memory 34 to the CPU 32. The system bus 36 may be any of several types of bus structures including a memory bus or a memory controller, a peripheral bus, and a local bus using any of a variety of bus architectures. The memory 34 includes read only memory (ROM) and random access memory (RAM). A basic input/output (BIOS) containing the basic routine that helps to transfer information between elements within the computer 30, such as during start-up, is stored in ROM. Storage devices 38, such as a hard disk, a floppy disk drive, an optical disk drive, etc., are coupled to the system bus 36 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 34 from at least one of the storage devices 38 with or without accompanying data.

An input device 40 such as a keyboard, pointing device (mouse), or the like, allows the user to provide commands to the computer 30. A monitor 42 or other type of output device is further connected to the system bus 36 via a suitable interface and provides feedback to the user. The desired response 22 can be provided as an input to the computer 30 through a communications link, such as a modem, or through the removable media of the storage devices 38. The drive signals 17 are provided to the physical system 10 of FIG. 1 based on program modules executed by the computer 30 and through a suitable interface 44 coupling the computer 30 to the vibration system 13. The interface 44 also receives the actual response 21.

Before describing the present invention, it may also be helpful to review, in detail, a known method for modeling the physical system 10 and obtaining the drive 17 to be applied thereto. Although described below with respect to a test vehicle, it should be understood that this prior art method and the present invention discussed below are not confined to testing only vehicles, but can be used on other types of test specimens and substructures or components thereof. In addition, the description is done assuming spectral analysis based modeling estimation and implementation though operations can be carried by several other linear mathematical techniques (e.g. Adaptive Filter Tuning or Adaptive Inverse Control (AIC) type models, parametric regression techniques such as Auto Regressive Exogenous (ARX) and State Space types of models, or combinations thereof).

Figure 3A:
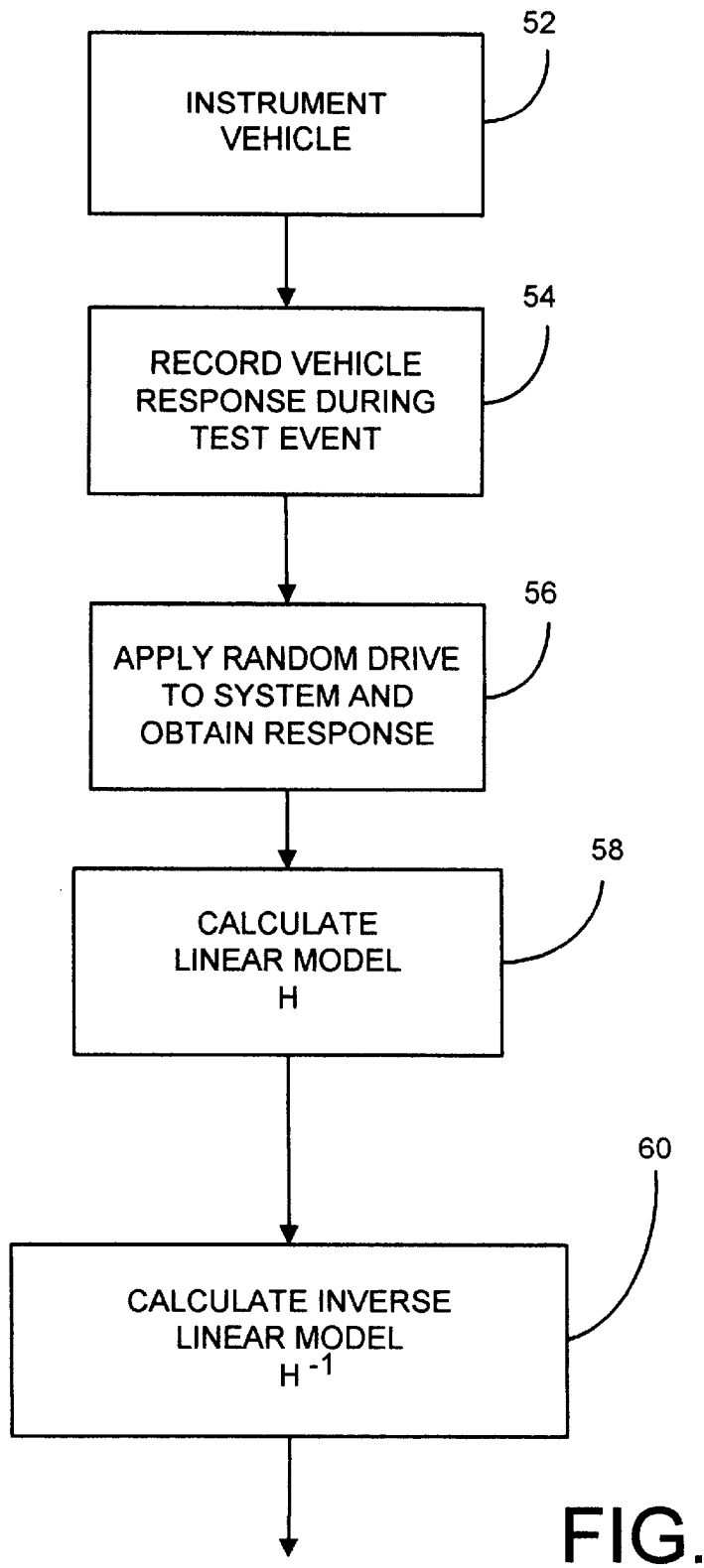
FIG. 3A is a flow chart illustrating the steps involved in a system identification phase of a prior art method of vibration testing.

Referring to FIG. 3A, at step 52, the test vehicle is instrumented with the remote transducers 20. At step 54, the vehicle is subjected to the field operating environment of interest and the remote transducer responses are measured and recorded. For instance, the vehicle can be driven on a road or test track. The measured remote transducer responses, typically analog, are stored in the computer 30 in a digital format through analog-to-digital converters, as is commonly known.

Next, in a system identification phase, the input/output linear system model of the physical system 10 is determined with the vehicle mounted on the laboratory test rig, this procedure includes providing drive 17 as an input to the physical system 10 and measuring the remote transducer response 21 as an output at step 56. The drive 17 used for linear model estimation can be random "white noise" having frequency components over a selected bandwidth. At step 58, an estimate of the linear model of the physical system 10 is calculated based on the input drive applied and the remote transducer response obtained at step 56. In one embodiment, this is commonly known as the "frequency response function" (FRF). Mathematically, the FRP is a N×M matrix wherein each element is a frequency dependent complex variable (gain and phase versus frequency). The columns of the matrix correspond to the inputs, while the rows correspond to the outputs. As appreciated by those skilled in the art, the FRF may also be obtained directly from prior tests using the physical system 10 or other systems substantially similar to the physical system 10

An inverse linear model $H(f)^{-1}$ is needed to determine the physical drive 17 as a function of the remote responses at step 60. As appreciated by those skilled in the art, the inverse linear model can be calculated directly. Also, the term "inverse" model as used herein includes a M×N "pseudo-inverse" model for a non-square N×M system.

Figure 3B:
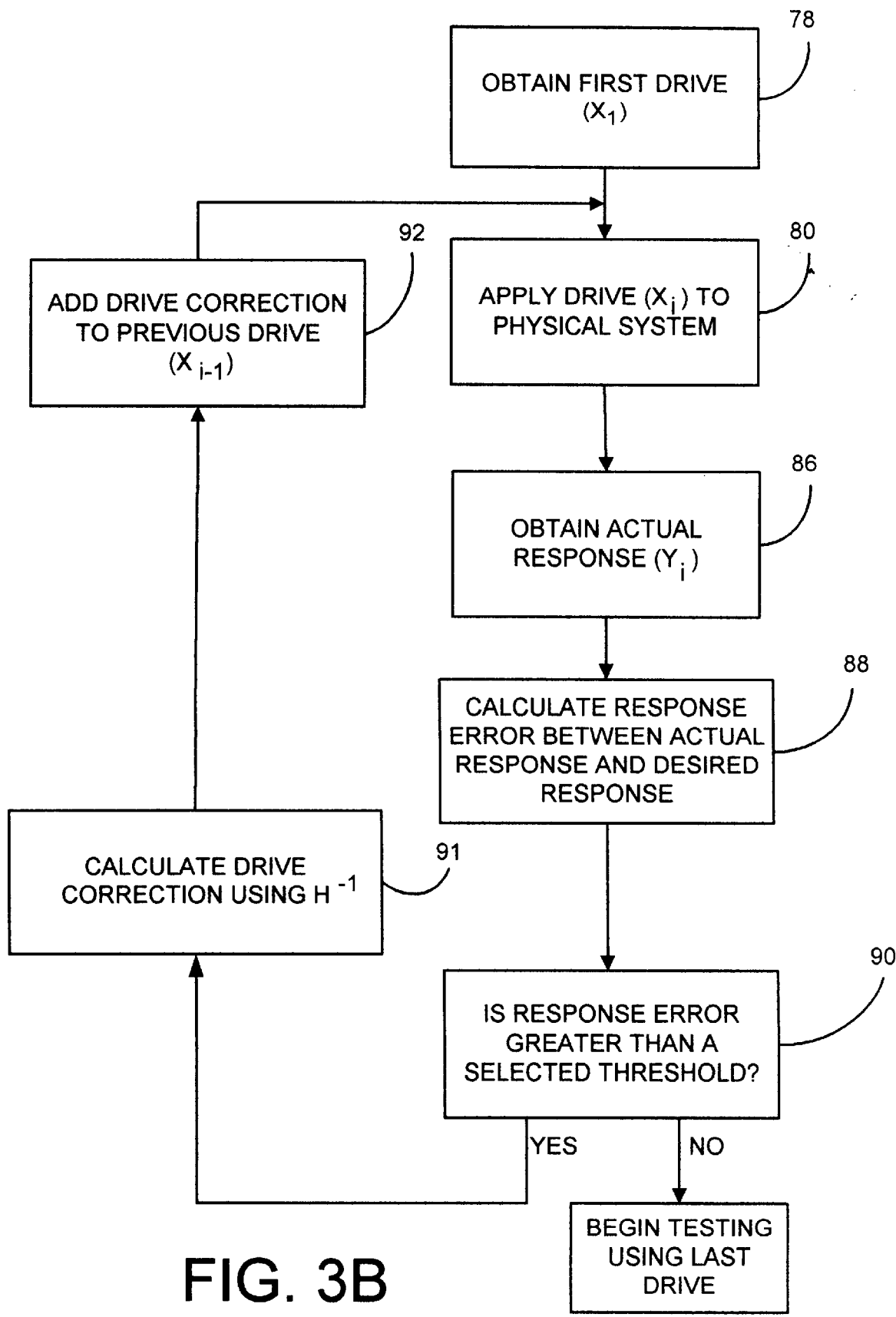
FIG. 3B is a flow chart illustrating the steps involved in an iterative phase of a prior art method of vibration testing.
Figure 4A:
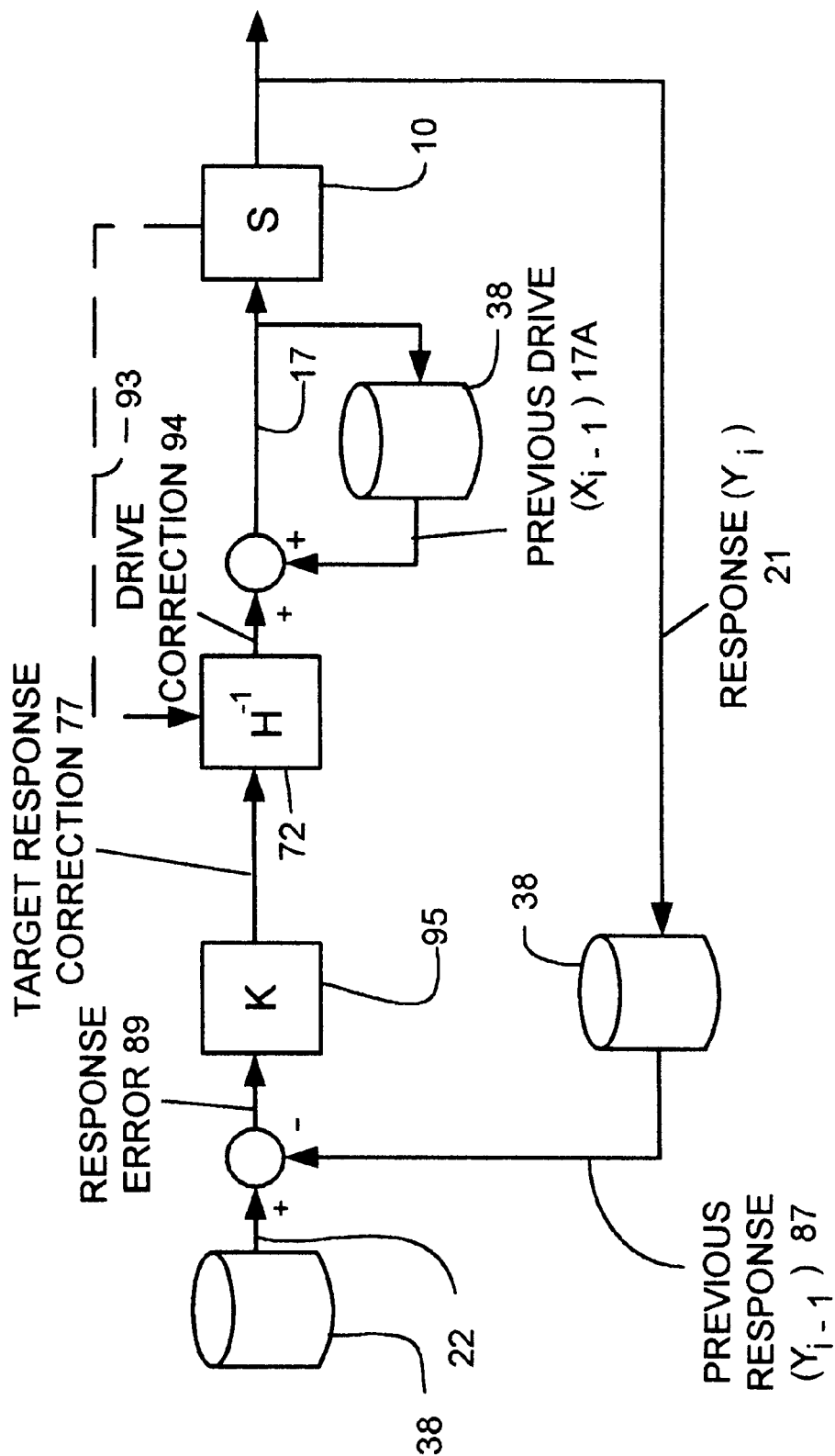
FIG. 4A is a detailed block diagram of a prior art iterative process for obtaining drive signals for a vibration system.

At this point in the prior art, the method enters an iterative phase, illustrated in FIGS. 3B and 4A, to obtain drive 17 which produces actual response 21 that ideally replicates the desired remote transducer response 22 (hereinafter "desired response"). The inverse physical system linear model $H(f)^{-1}$ is represented at 72, while physical system (vibration system, test vehicle, remote transducers and instrumentation) is represented at 10. Referring to FIG. 3B, at step 78, the inverse linear model 72 is applied to a target response correction 77 in order to determine an initial drive 17 $x_1(t)$. The target response correction 77 can be the desired response 22 for the initial drive, though most often it is reduced by a relaxation gain factor 95. The calculated drive 17 $x_1(t)$ from the inverse linear model 72 is then applied to the physical system 10 at step 80. The actual remote transducer response 21 (hereinafter "actual response") $y_1(t)$ of the physical system 10 to the applied drive 17 $x_1(t)$ is then obtained at step 86. If the complete physical system 10 is linear (allowing a relaxation gain 95 of unity), then the initial drive 17 $x_1(t)$ could be used as the required drive. However, since physical systems are typically nonlinear, the correct drive 17 has to be arrived at by an iterative process. (As appreciated by those skilled in the art, drive 17 used in previous tests for a similar physical system may be used as the initial drive.)

The iterative process involves recording the first actual response $y_1(t)$ resulting from the initial drive $x_1(t)$ and comparing it with the desired response 22 and calculating a response error 89 $\Delta y_1$ as the difference at step 88. (The first actual response signal $y_1(t)$ is provided at 87 in FIG. 4A.) The response error 89 $\Delta y_1$ is compared to a preselected threshold at step 90 and if the response error 89 exceeds the threshold an iteration is performed. Specifically the response error 89 $\Delta y_1$ is reduced by the relaxation gain factor 95 to provide the new target response correction 77. In this embodiment, the inverse transfer function $H(f)^{-1}$ is applied to the new target response correction 77 to create a drive correction $\Delta x_2$ 94 (step 91) that is added to the first drive $x_1(t)$ 17A to give a second drive $x_2(t)$ 17 at step 92. The iteration process (steps 80–92) is repeated until the response error 89 is brought down below the preselected threshold on all channels of the response. The last drive 17, which produced a response 21, that was within the predetermined threshold of the desired response 22, can then be used to perform specimen testing.

As described, the response error 89 $\Delta y$ is commonly reduced by the relaxation gain factor (or iteration gain) 95 to form the target response correction 77. The iteration gain 95 stabilizes the iterative process and trades off rate-of-convergence against iteration overshoot. Furthermore, the iteration gain 95 minimizes the possibility that the test vehicle will be overloaded during the iteration process due to nonlinearities present in the physical system 10. As appreciated by those skilled in the art, an iteration gain can be applied to the drive correction 94 $\Delta x$ and/or the response error 89. It should be noted in FIG. 4A that storage devices 38 can be used to store the desired response 22, the actual responses 21 and previous drives 17A during the iterative process. Of course, memory 34 can also be used. Also, a dashed line 93 indicates that the inverse linear model 72 is an estimate of the inverse of the physical system 10. The block diagram of FIG. 4A, as discussed above, can be implemented by those skilled in the art using commercially available software modules such as included with RPCIII™ from MTS Systems Corporation of Eden Prairie, Minnesota.

Figure 3C:
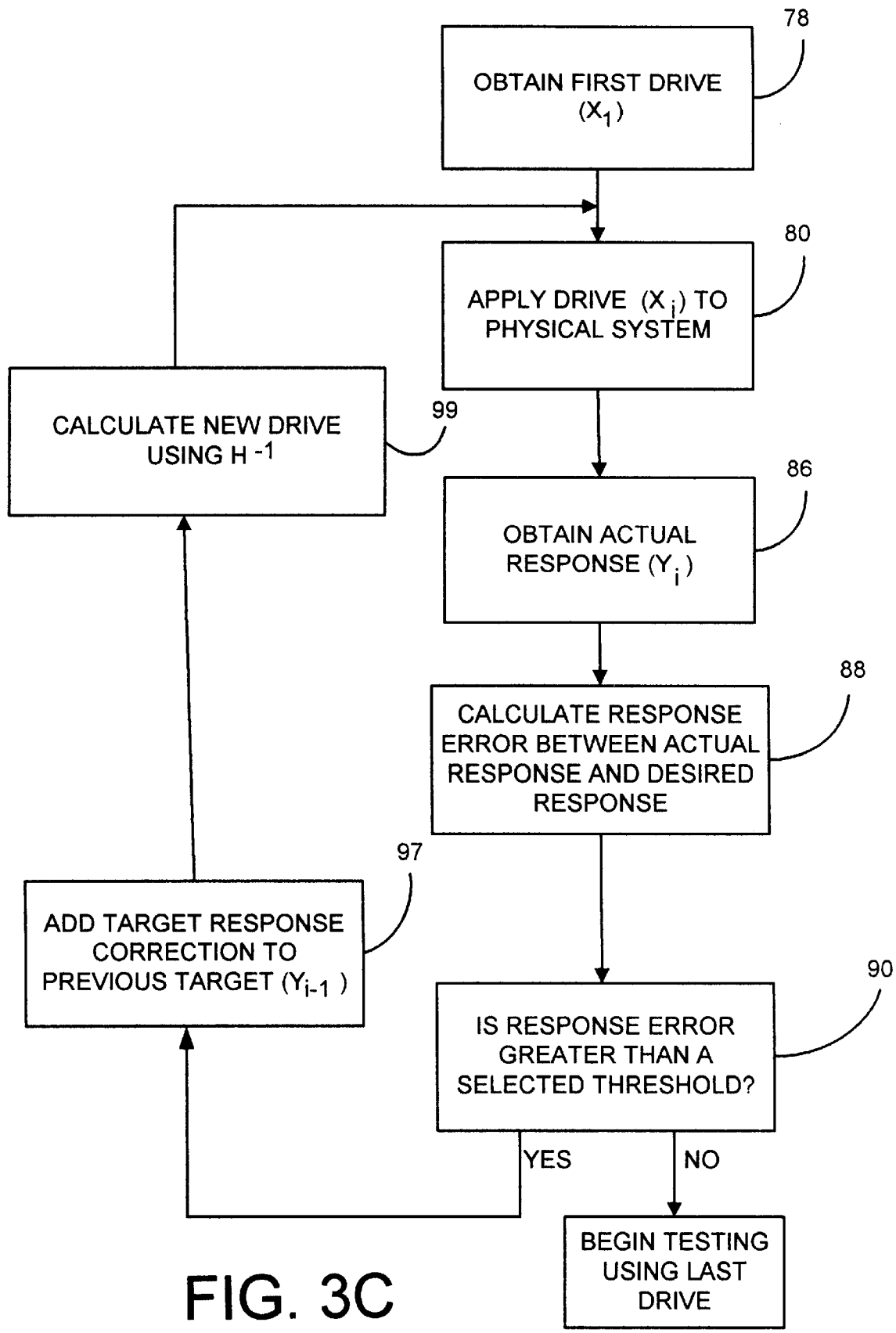
FIG. 3C is a flow chart illustrating the steps involved in another iterative phase of a prior art method of vibration testing.
Figure 4B:
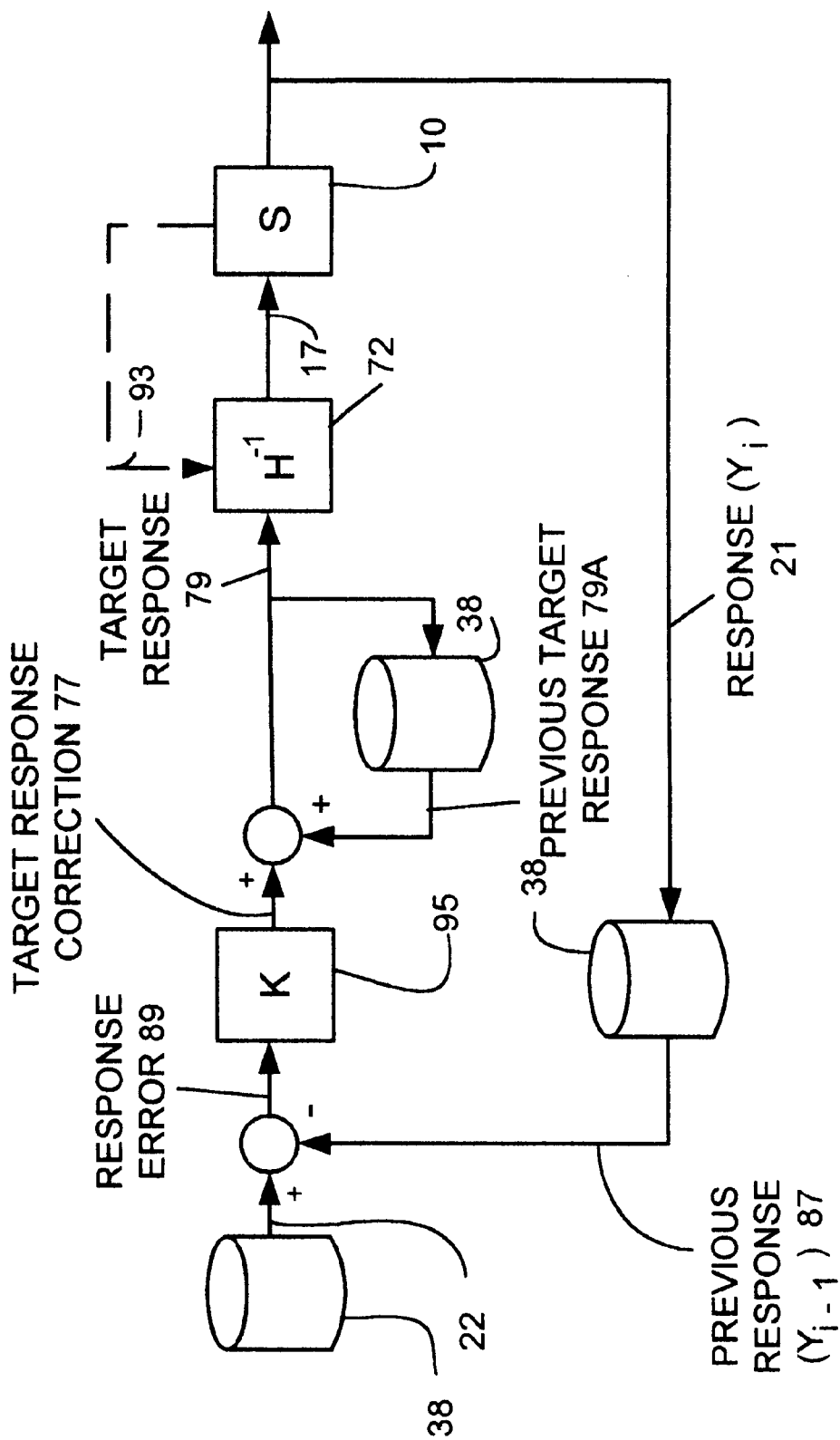
FIG. 4B is a detailed block diagram of another prior art iterative process for obtaining drive signals for a vibration system.

At this point, a modified method of the prior art for calculating the drive can also be discussed. The modified prior art method includes the steps of the identification phase illustrated in FIG. 3A and many of the steps of the iterative phase illustrated in FIG. 3B. For convenience, the iterative steps of the modified method are illustrated in FIG. 3C and the block diagram is illustrated in FIG. 4B. As illustrated in FIG. 4B, the calculation of the target response correction 77 is identical. However, if the response error 89 between the actual response 21 and the desired response 22 is greater than a selected threshold, then the target response correction 77 is added to a previous target response 79A at step 97 to obtain a new target response 79 for the current iteration. The inverse linear model 72 is applied to the target response 79 to obtain the new drive 17. As illustrated in FIG. 4S, the iteration gain 95 can be used for the reasons discussed above.

Figure 3D:
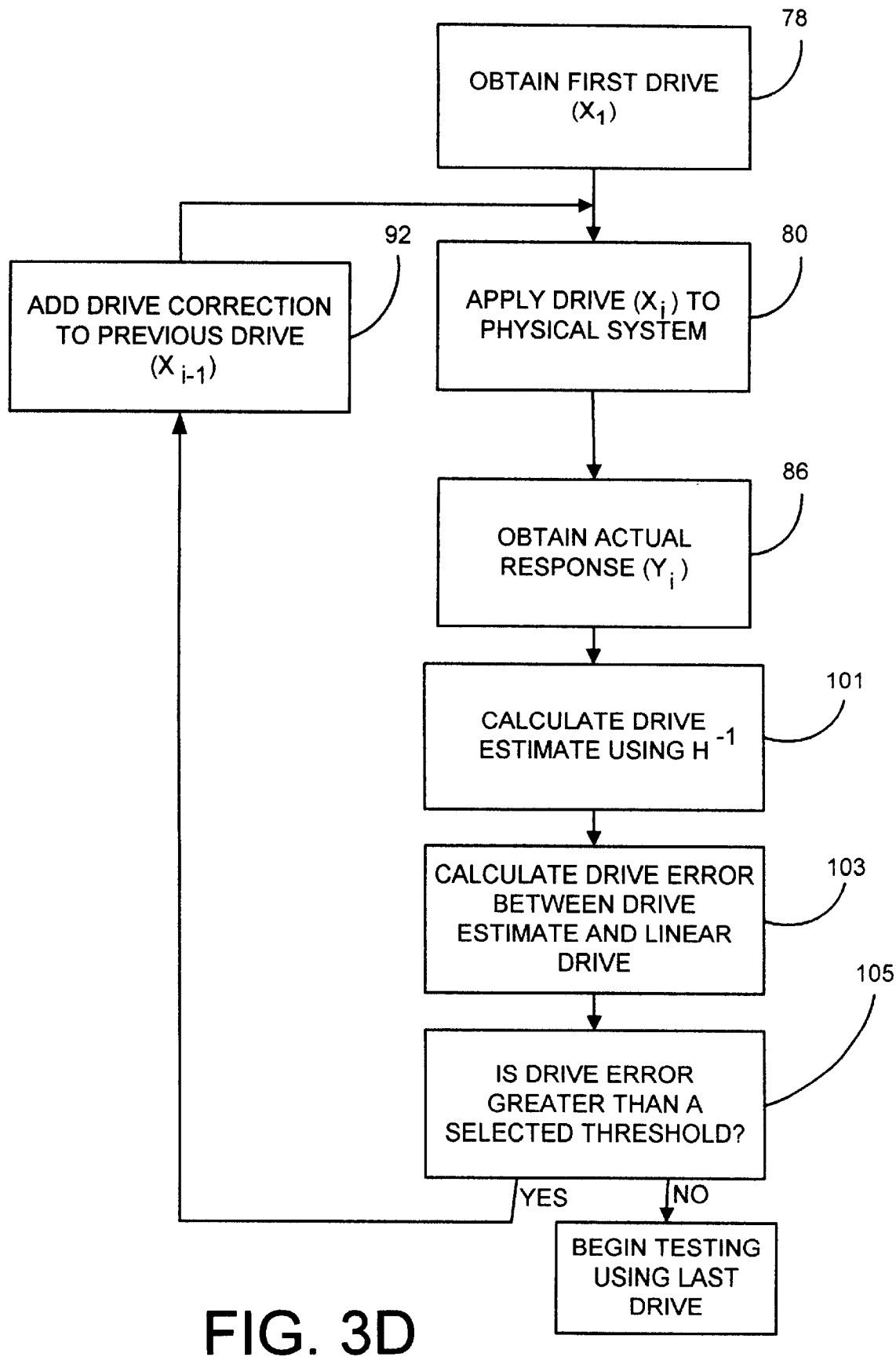
FIG. 3D is a flow chart illustrating the steps involved in another iterative phase of vibration testing.
Figure 4C:
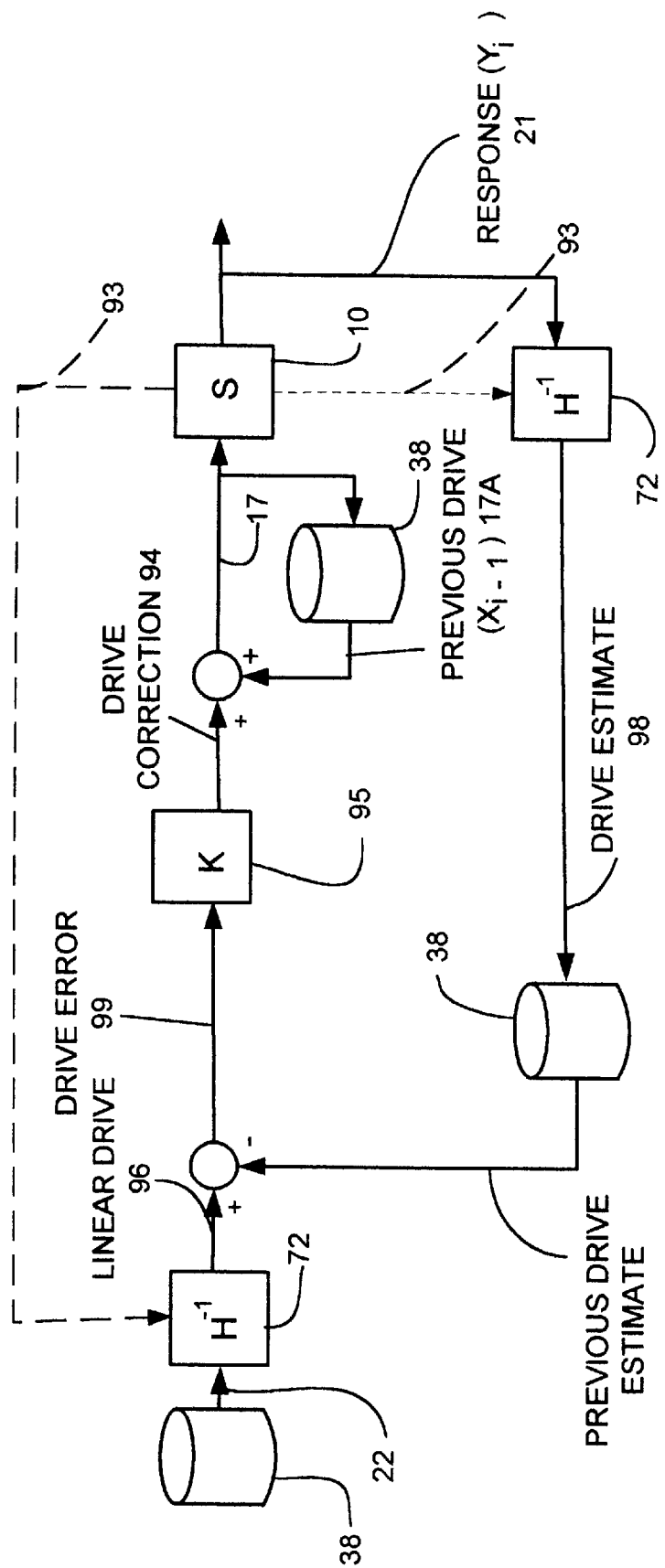
FIG. 4C is a detailed block diagram of another iterative process for obtaining drive signals for the vibration system.

A further iterative method for calculating the drive is illustrated in FIGS. 3D and 4C. As illustrated in FIG. 4C, a linear drive 96 is obtained by applying the inverse linear model 72 to the desired response 22. The linear drive 96 is used as a reference for comparison similar to how the desired response 22 was used in the methods described above. Accordingly, the inverse linear model 72 is applied to the actual response 21 to obtain a drive estimate 98 (step 101). If a drive error 99 between the drive estimate 98 and the linear drive 96 is greater than a selected threshold (step 103), then the drive correction 94 is added to a previous drive 17A at step 105 to obtain a new drive 17 for the current iteration. As illustrated in FIG. 4B, the iteration gain 95 can be used for the reasons discussed above.

Figure 5:
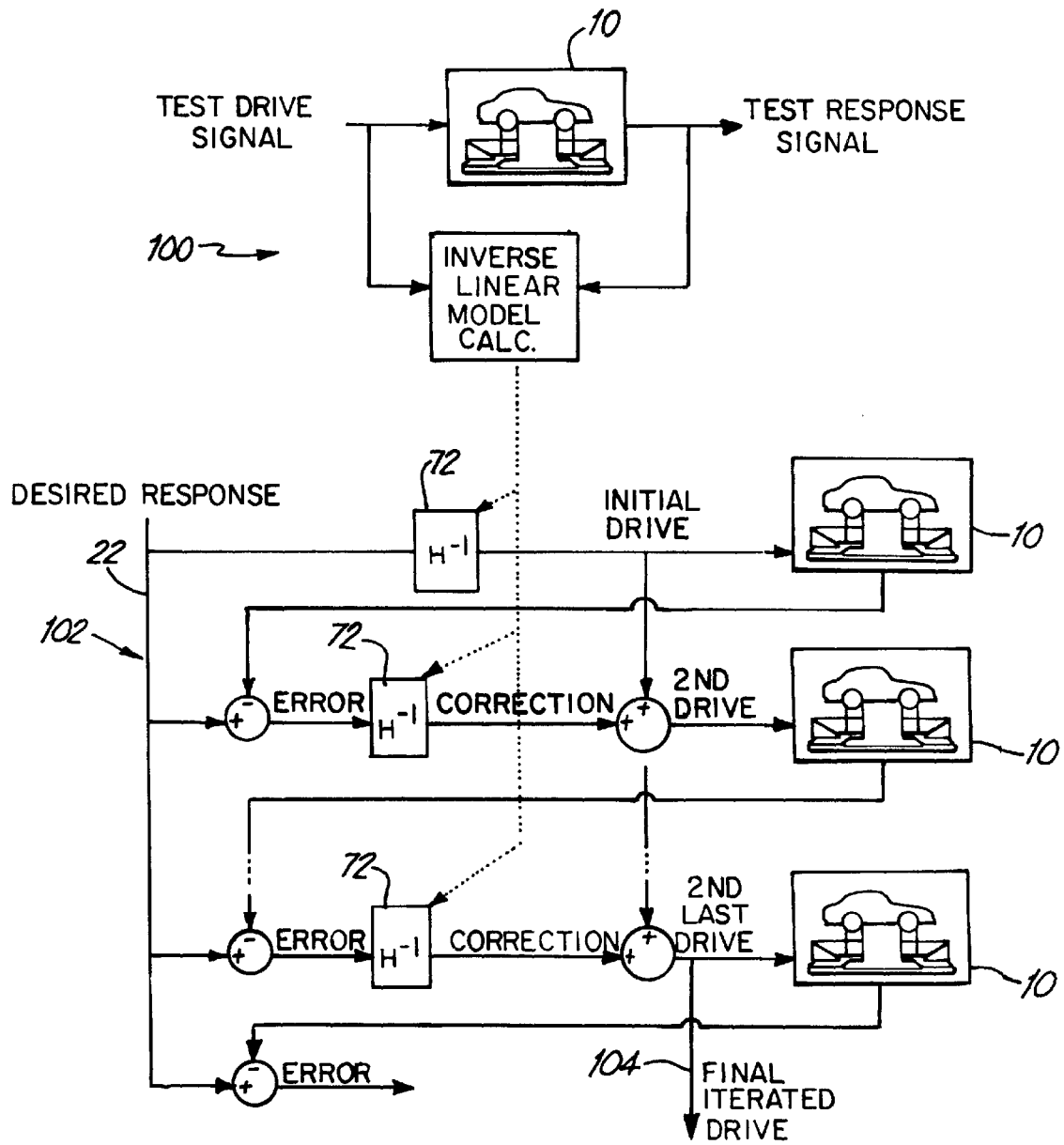
FIG. 5 is a block diagram/flow chart of the prior art system identification/iterative process for obtaining drive signals for a vibration system.

FIG. 5 is another block diagram flow chart illustrating the prior art technique of obtaining the drive signal for the system 10. In FIG. 5, like reference numbers have been used to identify similar elements as discussed above. "System identification" as described above with respect to FIG. 3A is shown generally at 100, while the iterative phase, described with respect to FIGS. 3B and 4A is illustrated generally at 102. The iterative phase 102 sequentially corrects the drive signal 17 and applies it to the system 10 until the response error 89 is within the predetermined threshold of the desired response 22. The final iterated drive signal is obtained at 104. Of course, a similar iterative phase corresponding to FIGS. 3C, 3D, 4B and 4C could also have been used to generate the final iterated drive signal 104.

Figure 6:
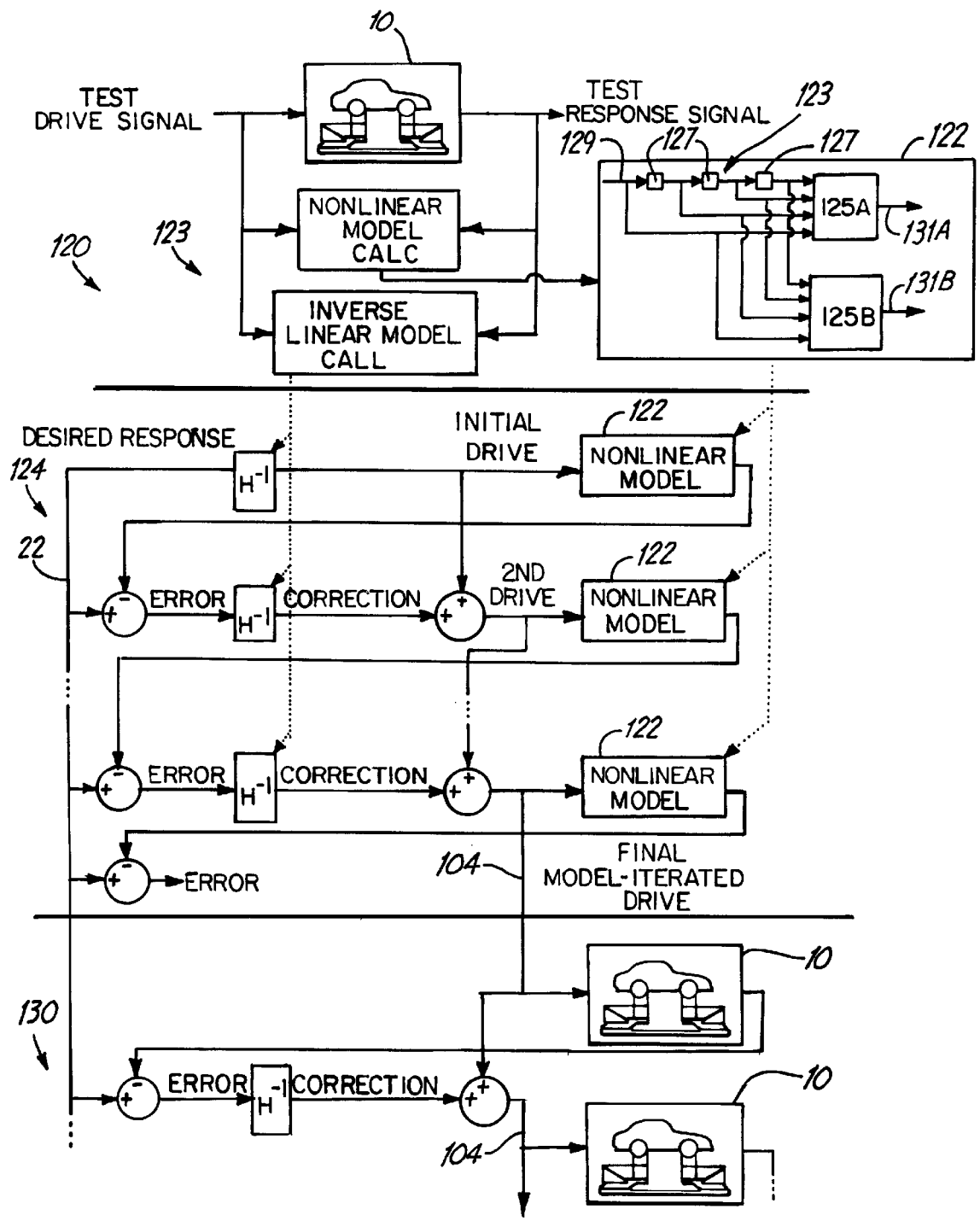
FIG. 6 is a block diagram/flow chart of a system identification/iterative process for obtaining drive signals for a vibration system of the present invention.

Using the format of FIG. 5, a first aspect of the present invention is illustrated in FIG. 6. Generally, FIG. 6 illustrates a method 120 to control the system 10 to produce a selected response, and in particular, to generate a suitable drive signal to produce the selected response. The method 120 includes obtaining a nonlinear model 122 of the system 10 in a system identification 123 and using the nonlinear model 122, rather than the system 10, during an iterative phase 124 (executed within system controller 23 of FIG. 1) to calculate or generate the final drive signal 104 intended to produce the desired response 22.

Figure 7:
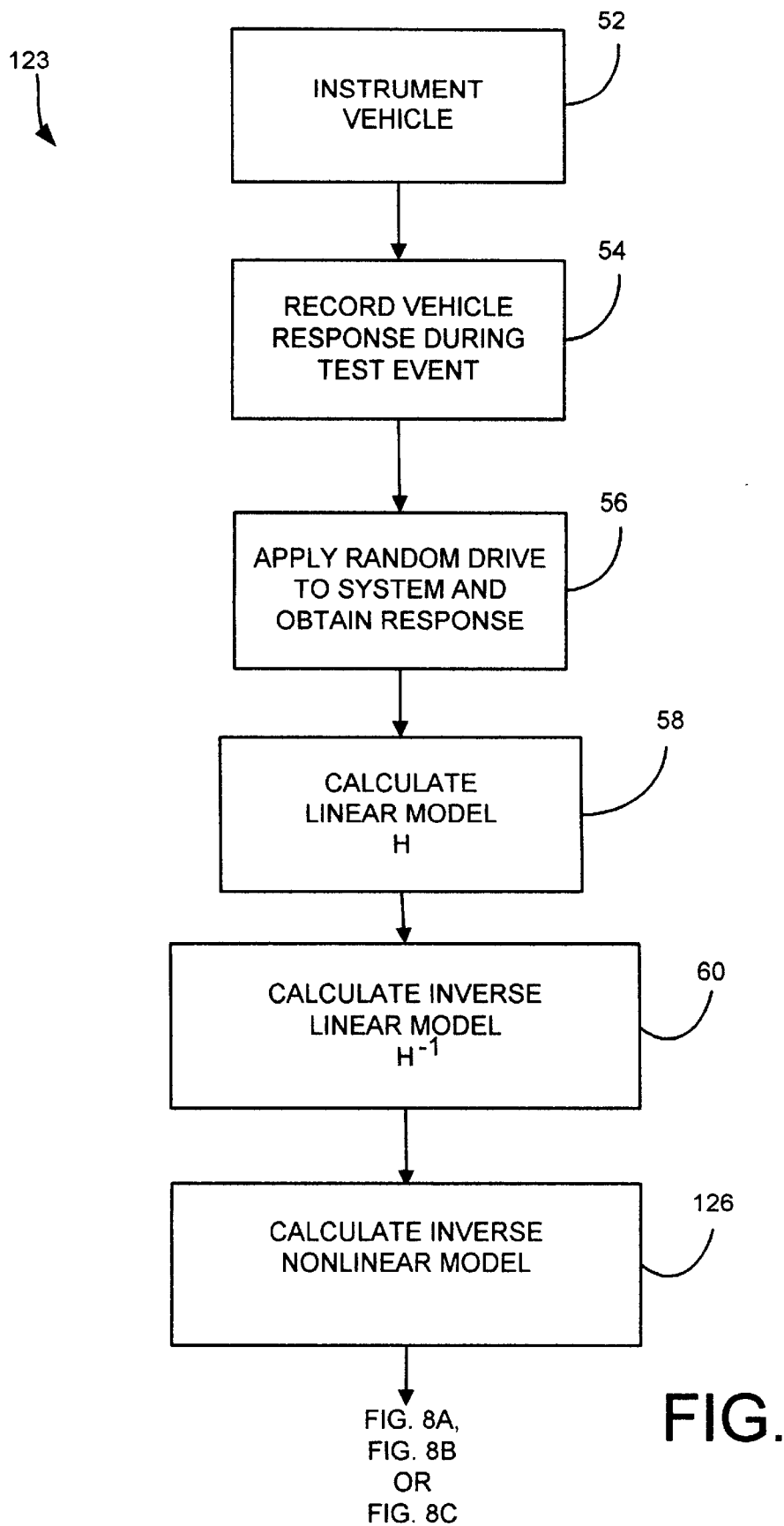
FIG. 7 is a flow chart illustrating the steps involved in a system identification phase of an exemplary method for obtaining a nonlinear system model.

An exemplary method of system identification 123 is illustrated in FIG. 7, which includes steps 52–60 as discussed above wherein an inverse linear system model 72 (e.g. inverse FRF) is obtained. System identification 123 however, also includes a step 126 that comprises calculating or generating the nonlinear system model 122. In general, the nonlinear system model 122 comprises a tapped delay line or structure 123 and at least one nonlinear regression structure 125A. The tapped delay line 123 comprises a set of series connected delay elements 127 that provide a set of delayed inputs for each input drive signal (commonly digital values obtained at a selected sampling frequency). In FIG. 6, one input drive signal 129 is illustrated although in many applications a plurality of individual drive signals are present, each drive signal being delayed by a corresponding tapped delay line to yield a corresponding set of delayed inputs. Typically, a nonlinear regression structure is provided for each output from the nonlinear model 122. In the embodiment illustrated, two regression structures 125A and 125B are shown and provide nonlinear model outputs 131A and 131B, respectively, but it should be understood that any number of nonlinear model outputs can be present. Likewise, although three delay elements 127 are shown any number of delay elements 127 can be used for each drive signal.

In one embodiment, the nonlinear regression structure 125A and 125B each comprises a neural network. Regression structures 125A and 125B are means for regression modeling. In place of the neural network other forms of regression structures (or means for regression modeling) such as "nearest neighbors", "support vector machines", "projection pursuit", "multiple adaptive regression spines", "hinging hyperplanes", "radial basis functions" "constrained topological mapping", etc. can also be used. Calculation of nonlinear regression models is well known in the art. For instance, software programs such as MATLAB, Neural Network Toolbox available from The Mathworks, Inc. of Natick, Mass. can be used to calculate a neural network based on the random drive and response of the system 10 to the drive obtained at step 56 in FIG. 7.

Of course other drive signals besides a random drive can be applied to the system 10 used to calculate the inverse linear model 72 and/or the nonlinear system model 122. For instance, synthetic random signals having a prescribed power spectrum can be used. Random signals obtained from previous tests on the same or similar test system can also be used. Random signals obtained by use of preliminary system models (i.e. analytic/computer models or equations representing the dynamics of the test system) can also be used. Furthermore, multiple channel random input signals may be statistically correlated or uncorrelated (i.e. "orthogonal").

It should also be noted that the nonlinear model 122 need not correspond to the system 10 for which drive signals are ultimately intended. In other words, the nonlinear model 122 may be generated using drive and response signals from test system A, wherein the nonlinear model 122 may be then used to generate drive signals for test system B, which differs from test system A in specimen, test rig, or both. However, the greater the similarity between test systems A and B, the better the results, in general.

Figure 8A:
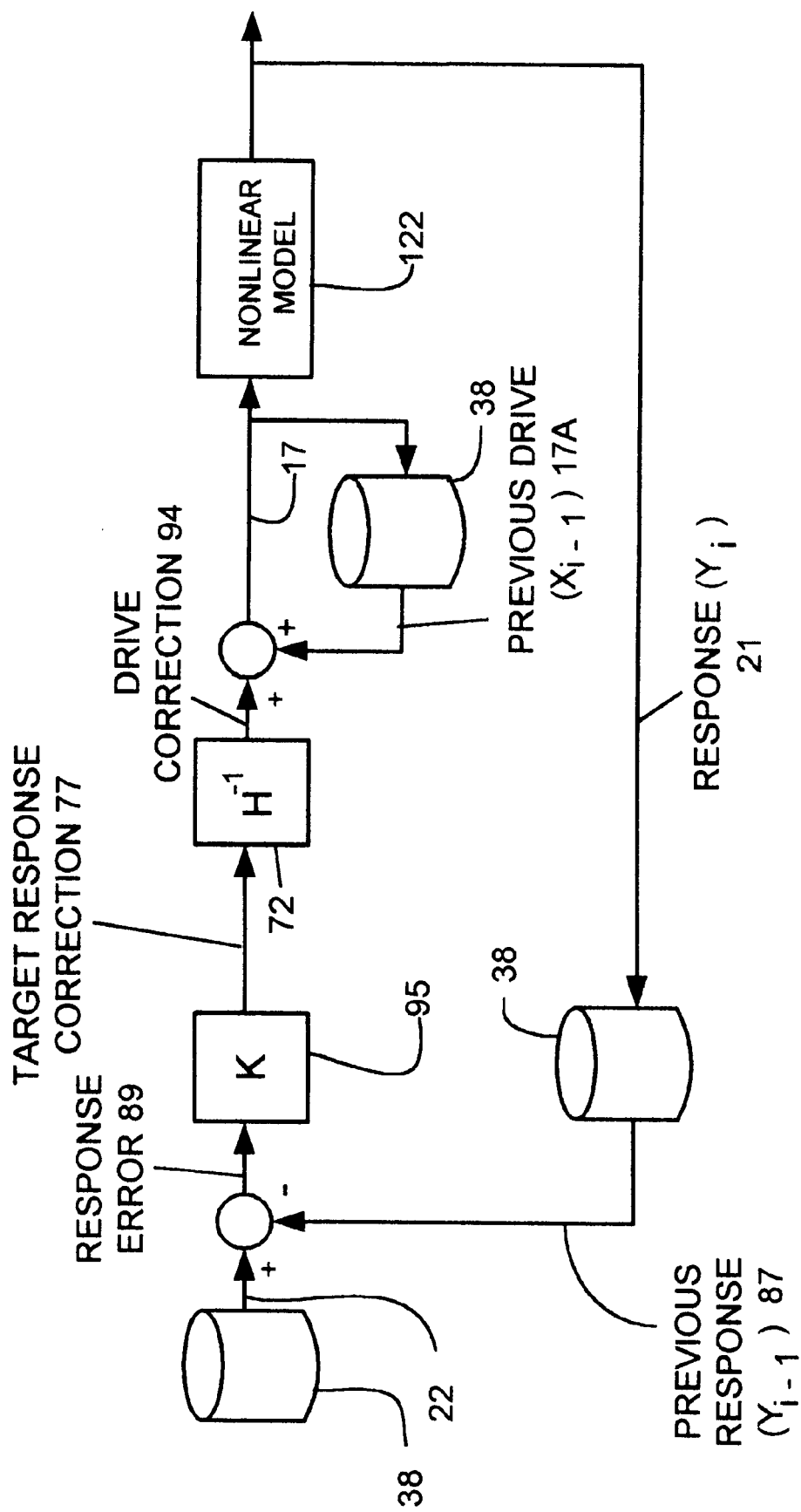
FIG. 8A is a detailed block diagram of a first iterative process for obtaining drive signals for a vibration system according to the present invention.
Figure 8B:
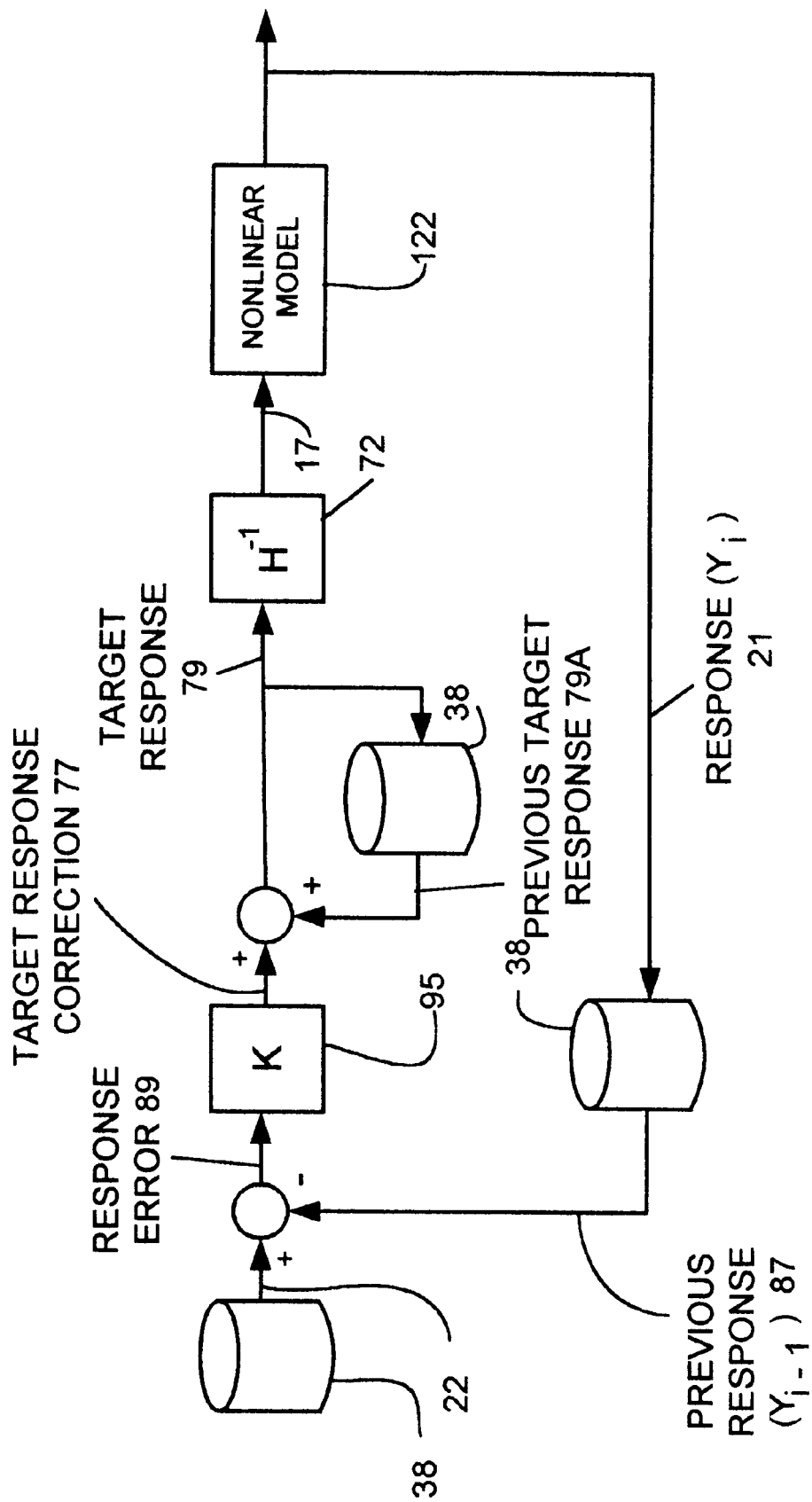
FIG. 8B is a detailed block diagram of a second iterative process for obtaining drive signals for a vibration system of the present invention.
Figure 8C:
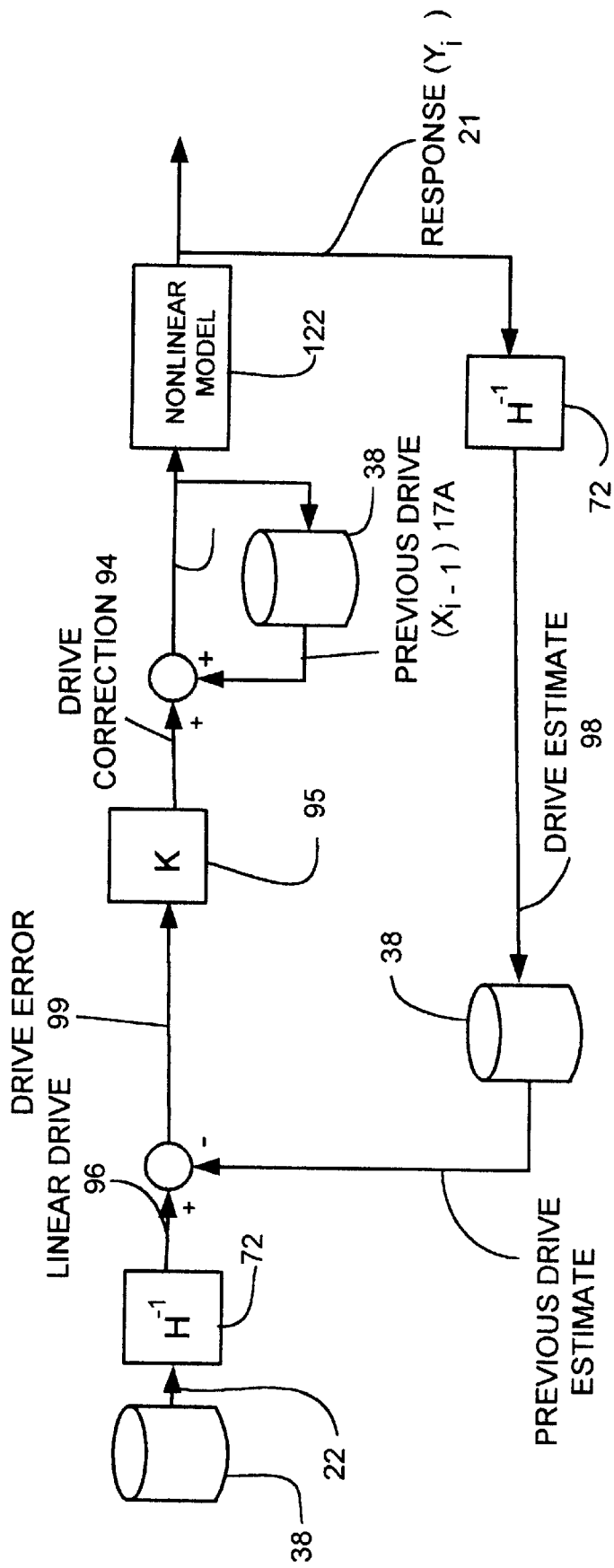
FIG. 8C is a detailed block diagram of a third iterative process for obtaining drive signals for a vibration system of the present invention.

The nonlinear system model 122 is a "forward model" that models the system 10. The nonlinear system model 122 is then used during the iterative phase 124, rather than the system 10, to iterate to the drive signal which realizes a response within a predetermined threshold of the desired response 22. FIG. 8A illustrates in block diagram form, the iterative phase 124 wherein a response error 89 and drive corrections 94 are used during the iterative process. If desired, the iterative phase 124 can be of the form where the response error 89 and target response corrections 77 are used, which is illustrated in FIG. 8B. Likewise, the iterative phase 124 can be of the form where the drive error 99 and drive corrections 94 are used, as illustrated in FIG. 8C.

Referring back to FIG. 6, in many cases, the final drive 104 obtained at the end of the iterative phase 124 is sufficiently accurate to obtain substantially the desired response 22 when applied to the system 10. However, if desired, conventional iteration can be performed as described above with respect to FIGS. 3B, 3C, 5D, 4A, 4B and 4C, which is generally illustrated at 130, to further refine the final drive signal 104. Likewise, if desired, the nonlinear system model 122 can be modified by further training, followed by more model iterations.

As appreciated by those skilled in the art, the inventive method described above substantially reduces the number of drive signals applied to the system 10 in order to obtain the appropriate drive signal to generate the desired response 22. Accordingly, wear and/or possible damage to the system 10 is substantially reduced.

It should be noted that the inverse linear system model 72 can be obtained using any of the following techniques. As illustrated in FIGS. 6 and 7, a forward linear model can be calculated using the same drive and response as those used for calculating the nonlinear system model 122, followed by inversion using conventional techniques.

Alternatively, the inverse linear system model 72 can also be obtained by re-identification of the forward linear model, wherein a prescribed drive signal is applied to the nonlinear system model 122, obtaining the subsequent response, and then calculating the forward linear model by conventional techniques. The forward linear model can then be inverted using conventional techniques. This approach offers the possibility of using a drive signal with characteristics different than those used for the nonlinear system model.

In yet another method, direct calculation of the forward linear model can be obtained by linearization of the nonlinear model equations, followed by conventional inversion.

The inverse linear model 72 can also be obtained directly without first calculating the forward linear model. For instance, calculation of the inverse linear model 72 can be performed directly using the same drive and response as those used for the nonlinear system model 122. In addition, the inverse linear model 72 can be re-identified by playing a prescribed drive signal into the nonlinear system model 122 and obtaining the subsequent response. The inverse linear model 72 can then be obtained by conventional techniques. Again, this approach offers the possibility of using a drive signal with characteristics different than those used for obtaining the nonlinear system model 122, which may be desirable for some desired responses. Also, the inverse linear model 72 can be directly calculated by linearization of equations in an inverted nonlinear system model.

The inverse linear model 72 described with respect to the method of FIG. 6 was static (i.e. non-changing values). However, adjustments to the inverse linear model 72 can also be made during the iteration phase as described in co-pending application Ser. No. 09/234,998, entitled, "METHOD AND APPARATUS FOR GENERATING DRIVE SIGNALS IN A VIBRATION TEST SYSTEM", filed Jan. 21, 1999, and incorporated herein by reference in its entirety.

Figure 9:
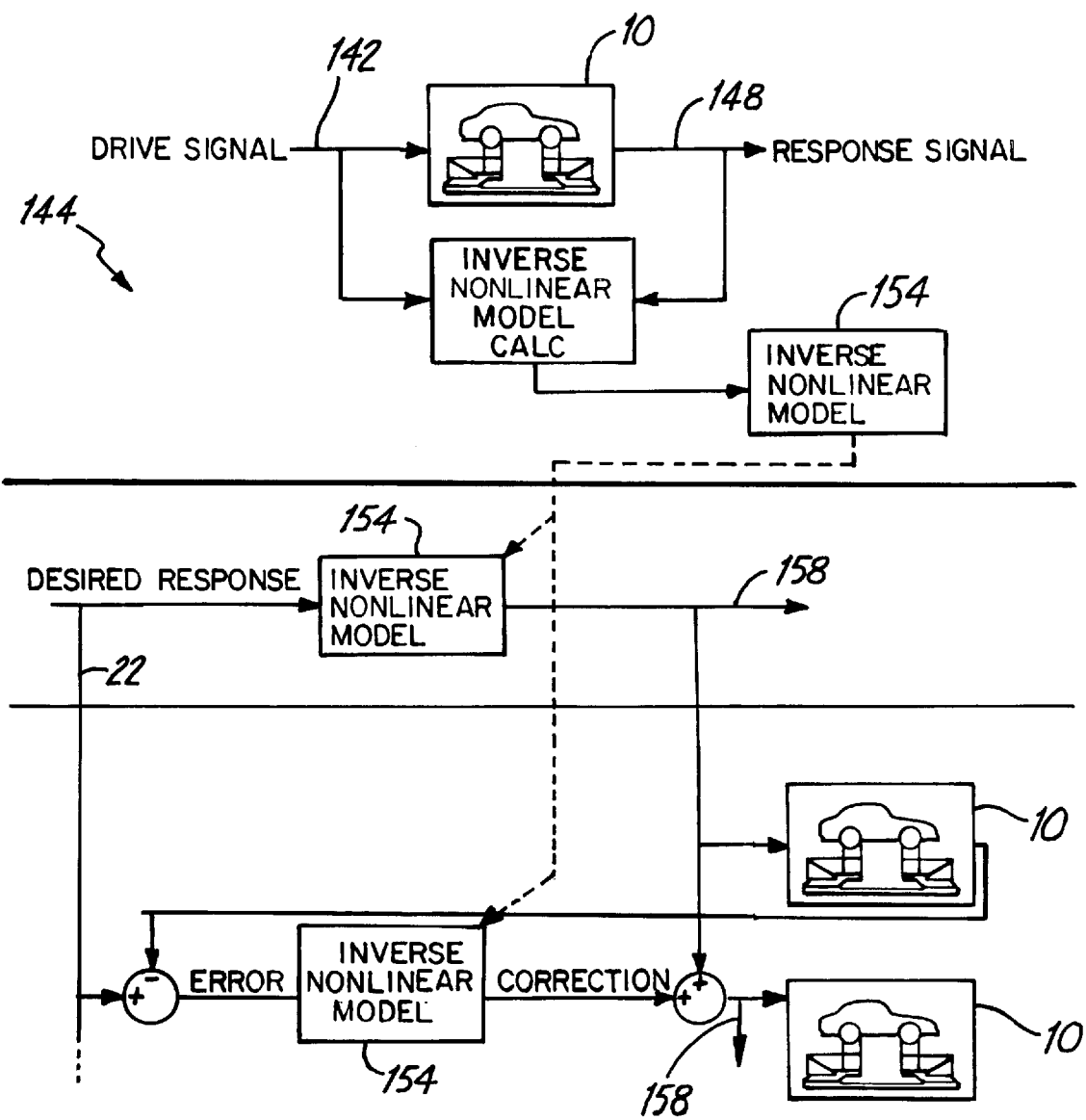
FIG. 9 is a block diagram/flow chart of a fourth process for obtaining drive signals for a vibration system according to the present invention.
Figure 10:
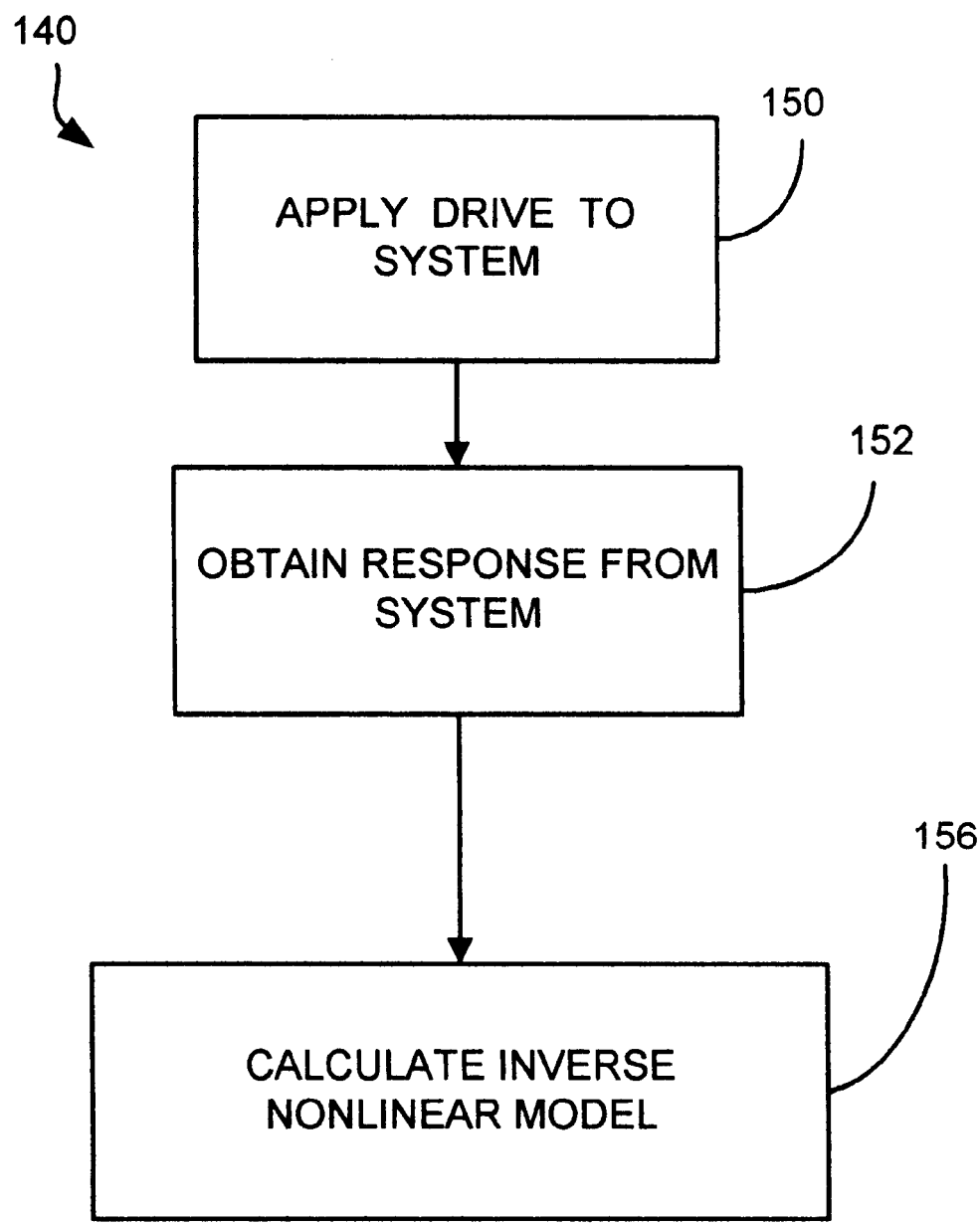
FIG. 10 is a portion of a flow chart illustrating a method in accordance with FIG. 9.

A second and separate aspect of the present invention is illustrated in FIGS. 9 and 10 and also is a method 140 of controlling a test system responsive to a drive signal to produce a selected response. Referring to FIGS. 9 and 10, the method 140 includes a system identification process 144 (FIG. 9) wherein a test drive signal 142 (FIG. 9) is applied to the system 10 at step 150 (FIG. 10). A subsequent response 148 of the system 10 to the test drive signal 142 is then obtained at step 152. Using the test drive signal 142 and subsequent response 148, an inverse nonlinear system model 154 (similar in structure to nonlinear model 122) is calculated at step 156. By applying the selected or desired response 22 to the inverse nonlinear system model 154, a final drive signal 158 is calculated. In view that the inverse nonlinear system model 154 was calculated and used to obtain the final drive signal 158, the model 154 more accurately models the system 10 than that which was obtainable from the linear system models, discussed above. In many cases, the final drive signal 158 is sufficiently accurate so that further iterations need not be necessary. However, if desired, iterative refinement of the drive signal 158 can be calculated using the inverse nonlinear system model 154 in a manner similar to that discussed above.

It should also be noted that iterative processing can take the form of any of the techniques discussed above, with respect to FIGS. 3B, 3C, 3D, 4A, 4B and 4C. Specifically, drive corrections can be obtained from the inverse nonlinear system model or from the inverse linear model as used in the prior art. Alternatively, target response corrections can be applied to the inverse linear system model 154 wherein the new drive signal is obtained therefrom.

In many instances, the desired response 22 is prerecorded so the final drive 158 can be calculated by application of the inverse nonlinear system model 154 to the desired response 22 without regard to how long processing might take. The final drive 158 can then be stored and applied to the system 10 as desired. However, in another embodiment, the nonlinear system model 154 can be suitably stored and accessed by a controller (e.g. computer or digital signal processor) for real time processing. In this manner, the desired response 22 can be an input to the controller wherein the controller calculates the drive for the system 10 using the nonlinear system model 154 on a real time basis in order that the system 10 subsequently produces the desired response as the actual response. This allows testing of the test specimen without first recording a desired response.

As indicated above, the nonlinear system model 122 and the inverse nonlinear system model 158 can be generated using a number of nonlinear modeling techniques. One particularly useful technique is a neural network.

Figure 11:
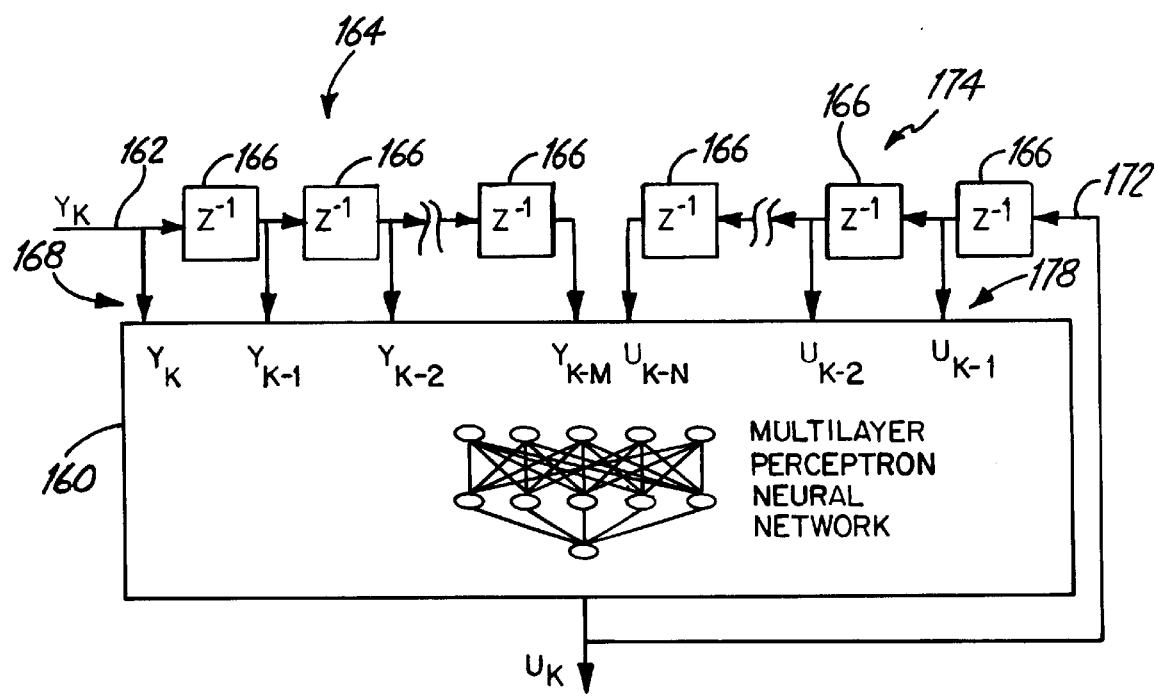
FIG. 11 is a block diagram of training a neural network structure for an inverse nonlinear model.

FIG. 11 illustrates training of a neural network structure 160 for an inverse model. For purposes of simplification, a single input/single output embodiment is illustrated. A physical system response 162 is provided to a tapped delay line 164 having a series of connected delay elements 166 that provide a plurality of delayed model inputs 168 to the neural network structure 160. A physical system drive 172 is used as the model output. If desired, the output 172 can be provided to a tapped delay line 174 having the series connected delay elements 166 to form a plurality of additional delayed model inputs 178 to the neural network structure 160. As appreciated by those skilled in the art, the number of delay elements 166 present in the tapped delay line 164 and the tapped delay line 174 can be chosen independently. The neural network structure 160 is a well-known multilayer perceptron network type wherein the number of hidden layers, the number of neurons in each hidden layer, and the number of inputs and the number of outputs can be chosen independently. In addition, the form of the activation functions present in the neural network structure 160 can take well-known forms such as hyperbolic tangent and logistic sigmoid, to name a few.

Figure 12:
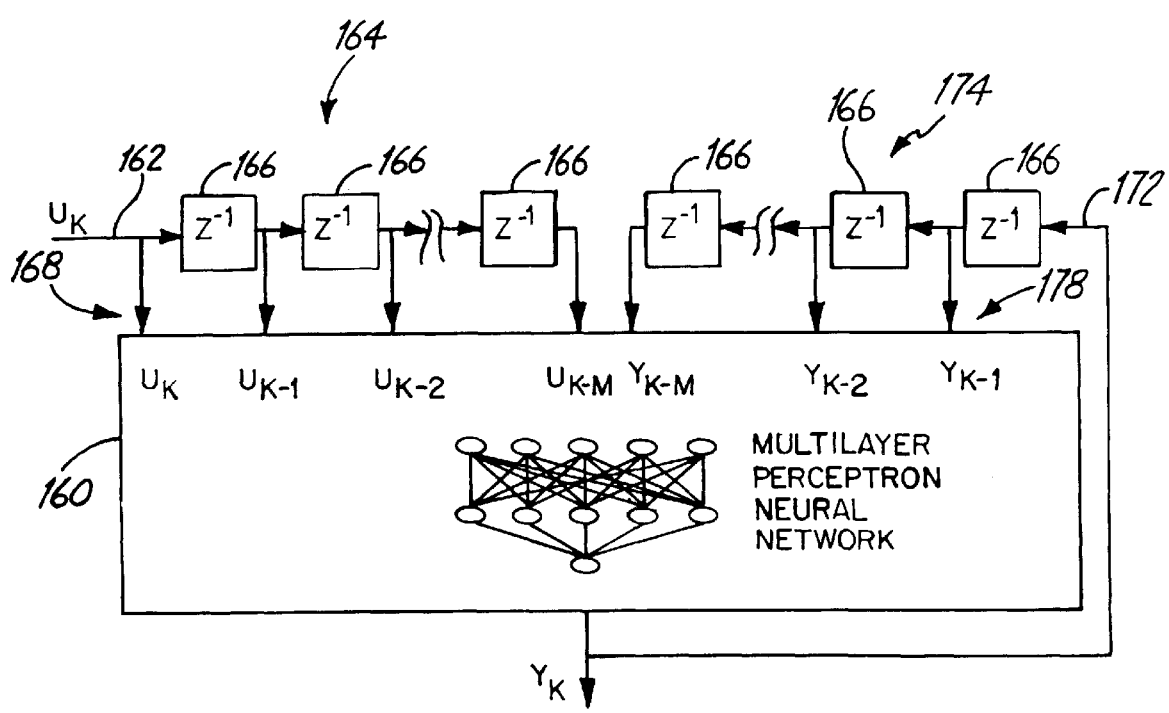
FIG. 12 is a block diagram of training a neural network structure for a forward nonlinear model.

In the embodiment illustrated in FIG. 11, an inverse neural network model is created wherein the model input comprises a physical system response and the model output comprises a physical system drive. Forward neural network models such as used in the embodiment described above with respect to FIG. 6 can be similarly developed. FIG. 12 illustrates training of a forward neural network model wherein the input 162 comprises the physical system drive and the output 172 comprises the physical system response.

As discussed above, multiple input/multiple output models can be created. Typically, a nonlinear system model, such as the neural network structure 160, is formed for a multiple input/single output application wherein a complete neural network model having multiple outputs is formed from a plurality of neural network structures, each providing a separate output as a function of a plurality of inputs.

Figure 13:
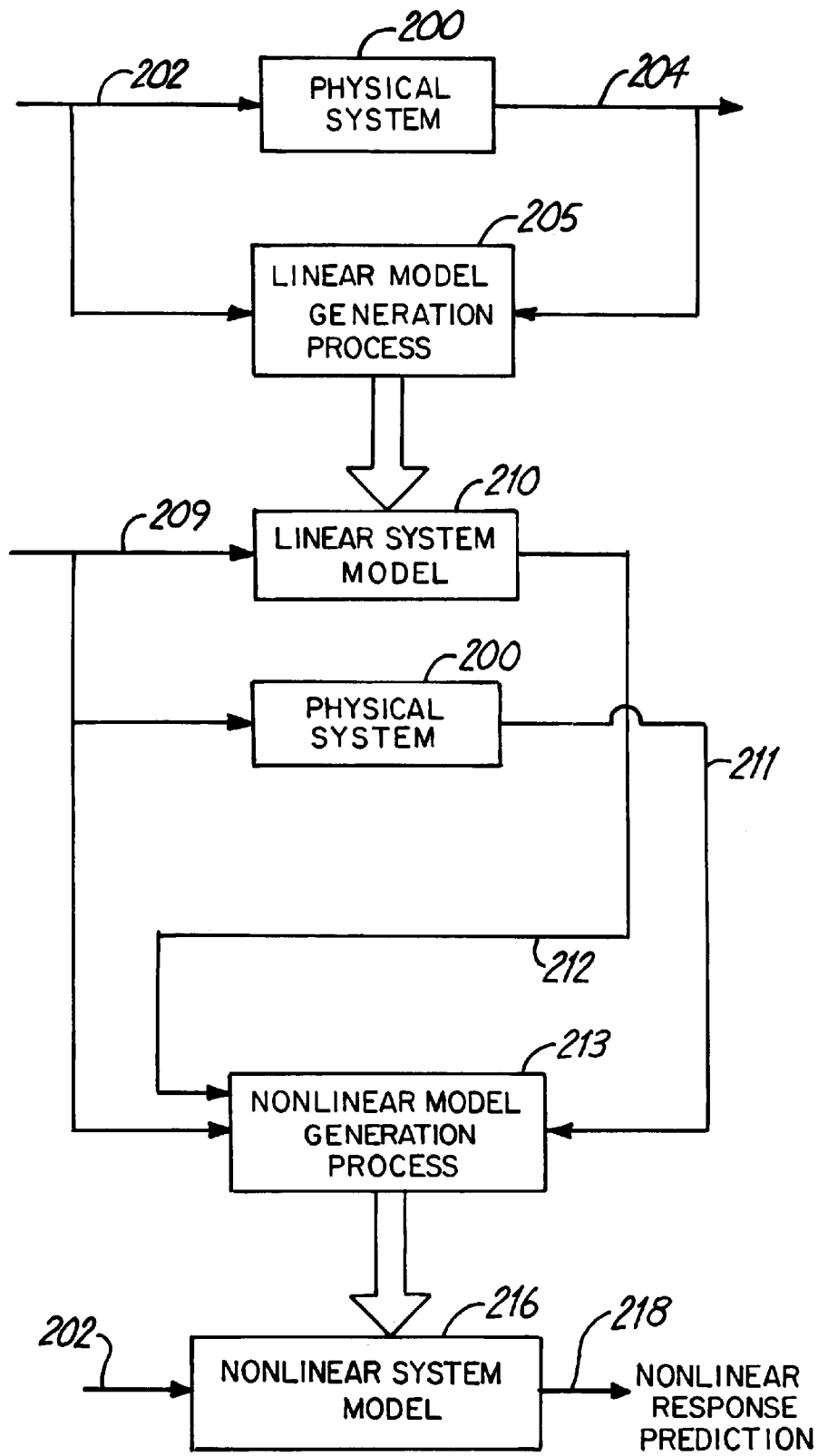
FIG. 13 is a flow chart illustrating a method for generating an improved nonlinear system model.

Although known methods for generating nonlinear models, such as generation of a neural network model as described above can be used in the aspects of the present invention discussed above, an improved method for nonlinear model generation is illustrated in FIG. 13. However, it should be understood that the method of FIG. 13 is not confined to use in modeling a vibration system in order to obtain suitable drive signals intended to produce a desired response, but rather, can be used to generate a nonlinear model of any physical system (e.g. a manufacturing process, a complex machine, a component such as a shock absorber, etc.) comprising one or more inputs and one or more outputs. Accordingly, the method of FIG. 13 constitutes a third and separate broad aspect of the present invention.

In FIG. 13, a physical system 200 receives one or more original system input signals at 202 and provides one or more first system output signals 204. The improved method of nonlinear model generation includes using the original system input signals 202 and the first system output signals 204 in a conventional linear model generation process 205, such as a FRF model generation process to generate a linear system model 210 (in either a forward or inverse model application).

An alternative input signal(s) 209 is then applied to the linear system models 210 and a linear output prediction 212 (corresponding generally to the first output system signal(s) 204) is obtained therefrom. The alternative input signal(s) 209 is also applied to the physical system 200 and a second system output signal 211 is obtained. The alternative input signal(s) 209, the second system output signal 211 and the corresponding linear output prediction 212 are then used in a nonlinear model generation process 213 (e.g. neural network modeling as discussed above) to generate a nonlinear system model 216 (in either a forward or inverse model application). Unlike conventional nonlinear modeling generation, which forms a nonlinear system model as a function of only the alternative input signal(s) 209 and the second output signal 211, the nonlinear system model 216 obtained is also a function of the corresponding linear response prediction 212. If the input signal(s) 202 is subsequently applied to the nonlinear system model 216, a nonlinear response prediction 218 accurately resembles the output signal 204, thereby verifying that the nonlinear system model 216 accurately models the physical system 200.

Figure 14:
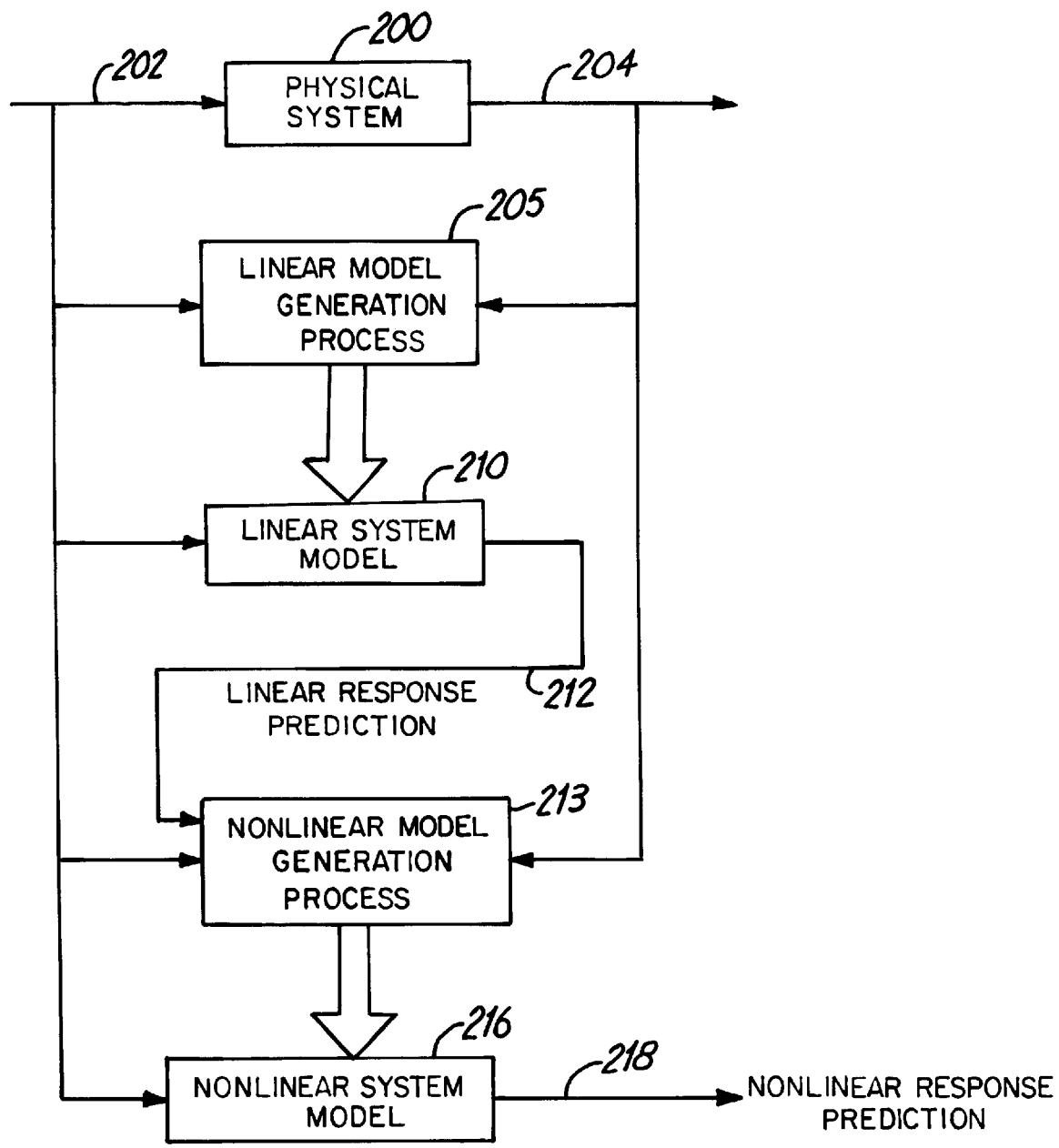
FIG. 14 is a flow chart illustrating a second method for generating an improved nonlinear system model.

In the embodiment illustrated, the separate input signals 202 and 209 have been used to generate the linear system model 210 and the inverse linear system model 216; however, as appreciated by those skilled in the art, the same input signals can be used This method is illustrated in FIG. 14.

Although the present invention has been described with reference to preferred embodiments, workers skilled in the art will recognize that changes may be made in form and detail without departing from the spirit and scope of the invention.

What is claimed is:

1. A method of controlling a test system responsive to a drive signal to produce a selected response signal, the method comprising:

(a) applying a drive signal to the system;
(b) obtaining a response signal of the system to the drive signal;
(c) generating a nonlinear system model using the drive signal and the response signal;
(d) generating an inverse linear system model;
(e) calculating a test drive signal using the selected response signal and the inverse linear system model;
(f) applying the test drive signal to the nonlinear system model;
(g) obtaining an actual response signal of the nonlinear system model to the test drive signal;
(h) calculating an error as a function of the actual response signal and the selected response signal;
if the error exceeds a selected threshold:
(i) obtaining a new drive signal ; and
(j) repeating steps (f) through (i) wherein the test drive signal is the new drive signal until the error is less than or equal to the selected threshold; and
(k) applying the test drive signal resulting from steps (e) or (i) to a test system.

2. The method of claim 1 wherein obtaining a new drive comprises:

calculating a target response signal correction;
calculating a drive correction using the inverse linear system model; and
combining the drive correction with a previous test drive signal to obtain a new test drive signal.

3. The method of claim 1 wherein obtaining a new drive comprises:

calculating a target response signal correction;
combining the target response signal correction with a previous target response signal; and
using the inverse linear system model to obtain the new drive.

4. The method of claim 1 wherein generating the inverse linear system model comprises:

generating a forward linear system model using the drive signal of step (a) and the response signal of step (b); and
calculating the inverse linear system model from the forward linear system model.

5. The method of claim 1 wherein generating the inverse linear system model comprises:

applying a selected drive signal to the nonlinear system model;
obtaining a resultant response signal from the nonlinear system model;
generating a forward linear system model using the selected drive signal and the resultant response signal; and
calculating the inverse linear system model from the forward linear system model.

6. The method of claim 1 wherein generating the inverse linear system model comprises:

linearizing equations of the nonlinear system model to obtain a forward linear system model; and
calculating the inverse linear system model from the forward linear system model.

7. The method of claim 1 wherein generating the inverse linear system model comprises:

generating the inverse linear system model using the drive signal of step (a) and the response signal of step (b).

8. The method of claim 1 wherein generating the inverse linear system model comprises:

applying a selected drive signal to the nonlinear system model;
obtaining a resultant response signal from the nonlinear system model; and
generating the inverse linear system model using the selected drive signal and the resultant response signal.

9. The method of claim 1 and further comprising:

calculating a linear system model and a response signal from the linear system model; and wherein generating the nonlinear system model includes using the response signal from the linear system model.

10. The method of claim 9 wherein obtaining the response signal from the linear system model includes applying an alternative input signal different than the first-mentioned drive signal.

11. A method of controlling a test system responsive to a drive signal to produce a selected response signal, the method comprising:
   (a) applying a drive signal to the system;
   (b) obtaining a response signal of the system to the drive signal;
   (c) generating an inverse nonlinear system model using the drive signal and the response signal;
   (d) applying the selected response signal to the inverse nonlinear system model to obtain a final drive signal; and
   (e) applying the final drive signal to the system.

12. The method of claim 11 wherein generating the inverse nonlinear system model includes:
   training a neural network using the drive signal and the response signal.

13. The method of claim 11 and further comprising:
   calculating a linear system model and a response signal from the linear system model; and
   wherein generating the inverse nonlinear system includes using the response signal from the linear system model.

14. The method of claim 13 wherein obtaining the response signal from the linear system model includes applying an alternative input signal different than the first-mentioned drive signal.

15. The method of claim 14 wherein the selected drive signal corresponds to the first-mentioned drive signal.

16. The method of claim 14 wherein the selected drive signal does not correspond to the first-mentioned drive signal, and wherein generating the inverse nonlinear system model includes using the selected drive.

17. A method of obtaining a non-linear system model of a system, the method comprising:
   (a) applying an original input to the system and obtaining a first system output from the system;
   (b) generating a linear system model using the original input and the first system output;
   (c) applying an alternative input to the linear system model and obtaining a linear system output from the linear system model; and
   (d) applying the alternative input to the system and obtaining a second system output from the system;
   (e) generating a nonlinear system model using the alternative input, the second system output from the system and the linear system output from the linear system model.

18. The method of claim 17 wherein the original input and the alternative input are the same.

19. The method of claim 17 wherein the nonlinear system model comprises a forward nonlinear system model and wherein the inputs comprise drive signals and the outputs comprise response signals.

20. The method of claim 17 wherein the nonlinear system model comprises an inverse nonlinear system model and wherein the inputs comprise response signals and the outputs comprise drive signals.

21. A vibration system for testing a test specimen, the vibration system comprising:
   an actuator system couplable to the test specimen; a servo controller coupled to operate the actuator system;
   a transducer for measuring a response due to operation of the servo controller;
   a system controller providing a drive signal to the servo controller and receiving a response signal from the transducer due to operation of the servo controller, the system controller having means for generating, storing and using a nonlinear system model of the test specimen, the actuator system and the servo controller to generate drive signals that when applied to the servo controller suitably replicate a selected response signal from the test specimen.

22. The vibration system of claim 21 wherein the nonlinear system model comprises a forward nonlinear system model.

23. The vibration system of claim 22 wherein the means for generating, storing and using the forward nonlinear system model to generate the drive signal comprises means for iteratively applying drive signals to the forward nonlinear system model.

24. The vibration system of claim 21 wherein the nonlinear system model comprises an inverse nonlinear system model.

25. The vibration system of claim 21 wherein the nonlinear system model comprises a regression structure and a tapped delay line providing a set of inputs to the regression structure.

26. A computer readable medium including instructions readable by a computer, which when implemented, cause the computer to control a physical system responsive to a drive signal to produce a selected response signal, the instructions performing steps comprising:
   (a) applying a drive signal to the system;
   (b) obtaining a response signal of the system to the drive signal;
   (c) generating a nonlinear system model using the drive signal and the response signal;
   (d) generating an inverse linear system model;
   (e) calculating a test drive signal using the selected response signal and the inverse linear system model;
   (f) applying the test drive signal to the nonlinear system model;
   (g) obtaining an actual response signal of the nonlinear system model to the test drive signal;
   (h) calculating an error as a function of the actual response signal and the selected response signal;
   if the error exceeds a selected threshold:
      (i) obtaining a new drive signal; and
      (j) repeating steps (f) through (i) wherein the test drive signal is the new drive signal until the error is less than or equal to the selected threshold; and
   (k) applying the test drive signal resulting from steps (e) or (i) to a test system.

27. The computer readable medium of claim 26 and further comprising instructions for:
   calculating a linear system model and a response signal from the linear system model; and
   wherein generating the inverse nonlinear system includes using the response signal from the linear system model.

28. The computer readable medium of claim 27 wherein obtaining the response signal from the linear system model includes applying an alternative input signal different than the first-mentioned drive signal.

29. A computer readable medium including instructions readable by a computer, which when implemented, cause the computer to control a physical system responsive to a drive signal to produce a selected response signal, the instructions performing steps comprising:

(a) applying a drive signal to the system;

(b) obtaining a response signal of the system to the drive signal;

(c) generating an inverse nonlinear system model using the drive signal and the response signal;

(d) applying the selected response signal to the inverse nonlinear system model to obtain a final drive signal; and (e) applying the final drive signal to the system.

30. The computer readable medium of claim 29 and further comprising instructions for:

calculating a linear system model and a response signal from the linear system model; and wherein generating the inverse nonlinear system includes using the response signal from the linear system model.

31. The computer readable medium of claim 30 wherein obtaining the response signal from the linear system model includes applying an alternative input signal different than the first-mentioned drive signal.

32. A computer readable medium including instructions readable by a computer, which when implemented, cause the computer to obtain a non-linear system model of a system, the instructions performing steps comprising:

(a) applying an original input to the system and obtaining a first system output from the system;

(b) generating a linear system model using the original input and the first system output;

(c) applying an alternative input to the linear system model and obtaining a linear system output from the linear system model; and (d) applying the alternative input to the system and obtaining a second system output from the system;

(e) generating a nonlinear system model using the alternative input, the second system output from the system and the linear system output from the linear system model.

33. The computer readable medium of claim 32 wherein the original input and the alternative input are the same.

34. The computer readable medium of claim 32 wherein the nonlinear system model comprises a forward nonlinear system model and wherein the inputs comprise drive signals and the outputs comprise response signals.

35. The computer readable medium of claim 32 wherein the nonlinear system model comprises an inverse nonlinear system model and wherein the inputs comprise response signals and the outputs comprise drive signals.

* * * * *

UNITED STATES PATENT AND TRADEMARK OFFICE
CERTIFICATE OF CORRECTION

PATENT NO. : 6,285,972 B1
APPLICATION NO. : 09/420023
DATED : September 4, 2001
INVENTOR(S) : Barber It is certified that error appears in the above-identified patent and that said Letters Patent is hereby corrected as shown below:

TITLE PAGE, ITEM (56)

OTHER PUBLICATIONS

Page 2, column 1, line 2 of second publication (Schenck Brochure), change "Muliple" to --Multiple--.

Page 2, column 2, line 4 of last publication (Richard Lund), change "in" to --of--.

CLAIMS

Col. 13, line 26, after "system" insert --model--.

Col. 14, line 60, after "the" delete "inverse".

Col. 15, line 17, after "system" insert --model--.

Signed and Sealed this

Twenty-sixth Day of February, 2008

JON W. DUDAS
*Director of the United States Patent and Trademark Office*